(12) United States Patent
Watanabe et al.

(10) Patent No.: US 9,319,654 B2
(45) Date of Patent: Apr. 19, 2016

(54) VIDEO DATA REPRODUCING APPARATUS, VIDEO DATA GENERATING APPARATUS AND RECORDING MEDIUM

(75) Inventors: Shuichi Watanabe, Chiba (JP); Jiro Kiyama, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 612 days.

(21) Appl. No.: 12/798,178

(22) Filed: Mar. 31, 2010

(65) Prior Publication Data
US 2010/0195985 A1 Aug. 5, 2010

Related U.S. Application Data

(63) Continuation of application No. 11/920,937, filed as application No. PCT/JP2006/311841 on Jun. 13, 2006, now Pat. No. 8,401,368.

(30) Foreign Application Priority Data

Jun. 20, 2005 (JP) ................................ 2005-179791
Aug. 5, 2005 (JP) ................................ 2005-227579

(51) Int. Cl.
*H04N 5/783* (2006.01)
*H04N 9/82* (2006.01)
(Continued)

(52) U.S. Cl.
CPC ............ *H04N 9/8227* (2013.01); *G11B 27/005* (2013.01); *G11B 27/3027* (2013.01); *G11B 27/322* (2013.01); *H04N 5/783* (2013.01); *H04N 19/44* (2014.11); *H04N 19/46* (2014.11); *H04N 21/4316* (2013.01); *H04N 21/4325* (2013.01); *H04N 21/440281* (2013.01); *H04N 5/45* (2013.01)

(58) Field of Classification Search
CPC ..... H04N 5/445; H04N 21/4147; H04N 5/76; H04N 19/00545; H04N 21/4316
USPC ......................................................... 386/248
See application file for complete search history.

(56) References Cited

U.S. PATENT DOCUMENTS 4,890,168 A * 12/1989 Inoue et al. ................... 386/343
5,852,474 A * 12/1998 Nakagaki et al. ............. 348/564
(Continued)

FOREIGN PATENT DOCUMENTS

CN 1431661 A1 7/2003
EP 1367588 A2 12/2003
(Continued)

*Primary Examiner* — Thai Tran
*Assistant Examiner* — Jose Mesa
(74) *Attorney, Agent, or Firm* — Mintz Levin Cohn Ferris Glovsky and Popeo, P.C.; David G. Conlin; Steven M. Jensen

(57) ABSTRACT

To provide a video data reproducing apparatus or the like, which includes: a flag reader 101 for reading out a flag that designates a playback style during special playback, from video data; decoders 102 and 103 for decoding two sets of video data; a synthesizer 106 for combining the decoded videos to output the result; and a manager 109 for controlling the operations of decoders 102, 103 and synthesizer 106 in accordance with the flag value, and which manages the playback style in the special playback during picture-in-picture playing in accordance with the flag value, to thereby realize the playback style of the picture-in-picture video during the special playback that reflects the distributor's intention.

16 Claims, 19 Drawing Sheets

(51) Int. Cl.

| | | |
|---|---|---|
| G11B 27/00 | (2006.01) | |
| G11B 27/30 | (2006.01) | |
| G11B 27/32 | (2006.01) | |
| H04N 21/431 | (2011.01) | |
| H04N 21/432 | (2011.01) | |
| H04N 21/4402 | (2011.01) | |
| H04N 19/46 | (2014.01) | |
| H04N 19/44 | (2014.01) | |
| H04N 5/45 | (2011.01) | |

(56) References Cited

U.S. PATENT DOCUMENTS

| | | |
|---|---|---|
| 5,923,627 A | 7/1999 | Miwa et al. |
| 6,160,590 A | 12/2000 | Shimizu et al. |
| 6,553,179 B1 | 4/2003 | Miwa et al. |
| 7,366,396 B2 * | 4/2008 | Yoo et al. .................. 386/356 |
| 2003/0184679 A1 | 10/2003 | Meehan |
| 2004/0131332 A1 | 7/2004 | Wilson et al. |
| 2004/0168185 A1 | 8/2004 | Dawson et al. |
| 2006/0078301 A1 | 4/2006 | Ikeda et al. |

FOREIGN PATENT DOCUMENTS

| | | |
|---|---|---|
| JP | 2002-344893 A | 11/2002 |
| JP | 2003-289509 A | 10/2003 |
| WO | WO-2004/030351 | 4/2004 |
| WO | WO-2005/029836 A2 | 3/2005 |
| WO | WO-2005/039177 A1 | 4/2005 |

* cited by examiner

| Playback style | | Playback style indication flag | |
|---|---|---|---|
| Main video | Sub video | Ind. | Dep. |
| Playback style (A) | Special Playback | Special Playback | × | ○ |
| Playback style (C) | Special Playback | Normal Playback | ○ | × |

( ○ : enable ×: disable )

602

| Playback style | | Dep. playback disable flag | |
|---|---|---|---|
| Main video | Sub video | True | False |
| Playback style (A) | Special Playback | Special Playback | × | ○ |
| Playback style (C) | Special Playback | Normal Playback | ○ | ○ |

( ○ : enable ×: disable )

603

| Playback style | | Ind. playback disable flag | |
|---|---|---|---|
| Main video | Sub video | True | False |
| Playback style (A) | Special Playback | Special Playback | ○ | ○ |
| Playback style (C) | Special Playback | Normal Playback | × | ○ |

( ○ : enable ×: disable )

FIG.8
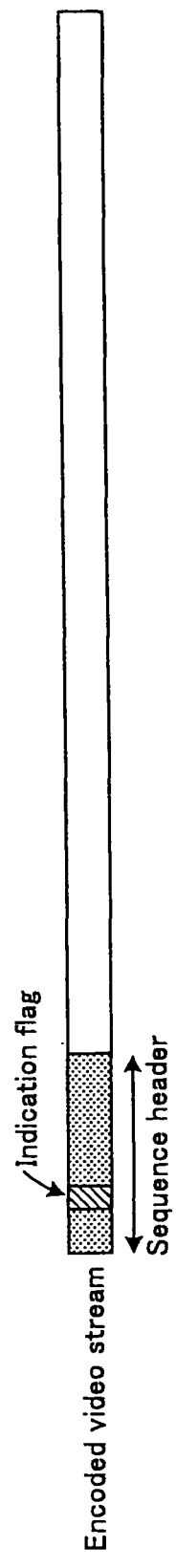
801: In the sequence header of an encoded video stream
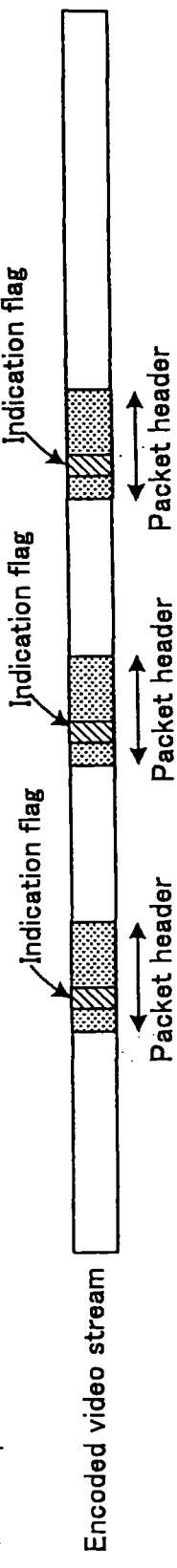
802: In the packet header of an encoded video stream
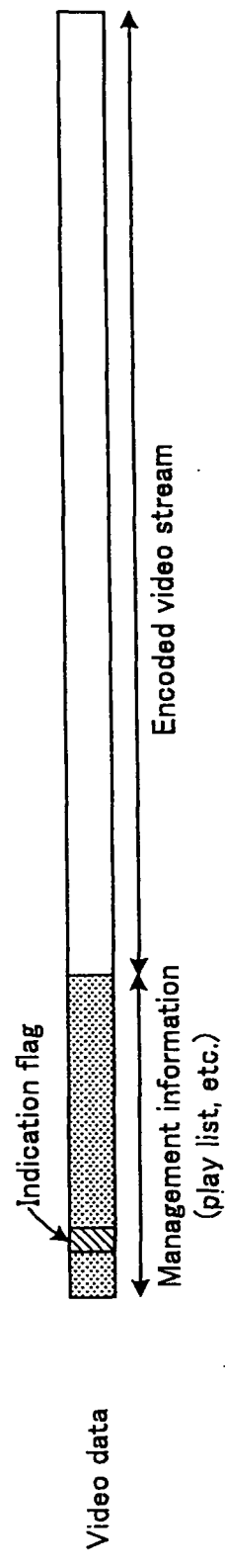
803: In the management information of video data FIG. 10
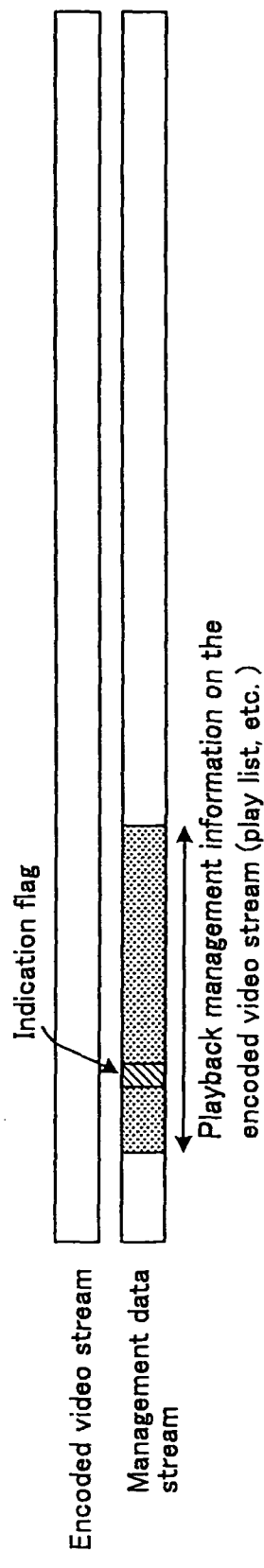
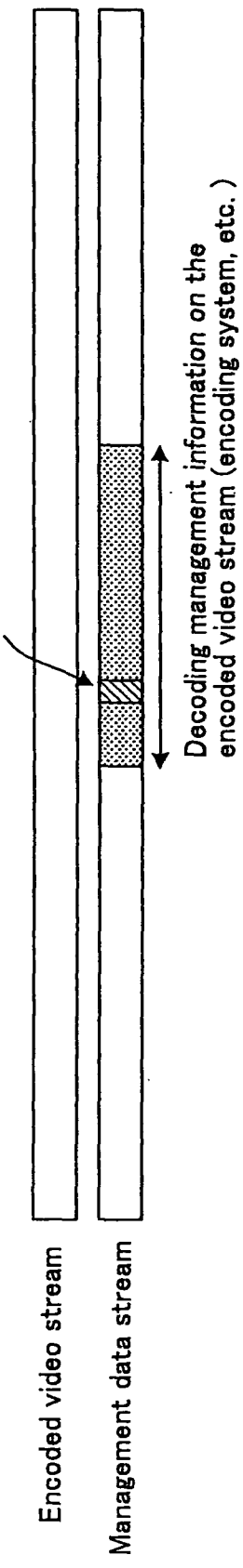

FIG. 12
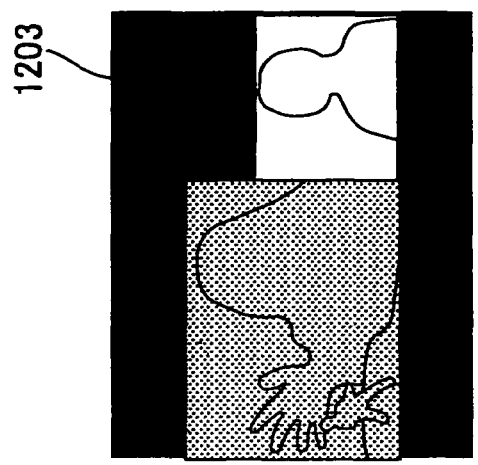
1203
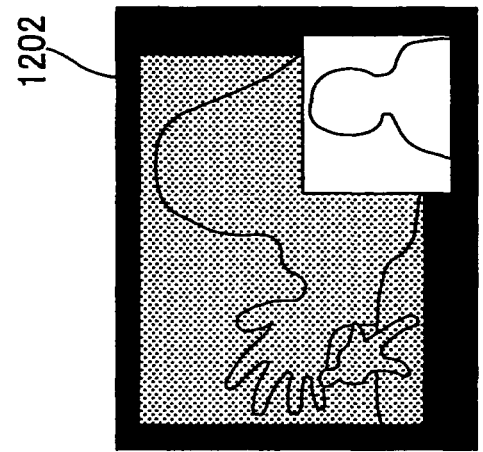
1202
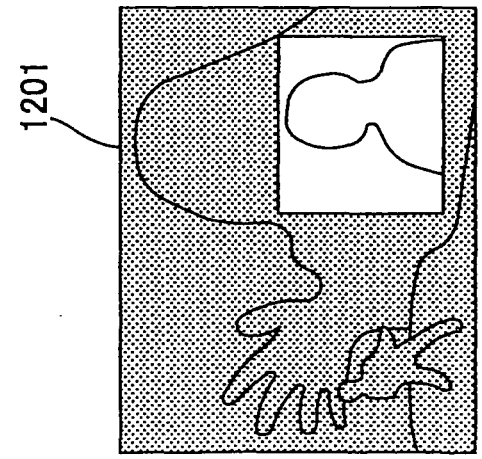
1201

VIDEO DATA REPRODUCING APPARATUS, VIDEO DATA GENERATING APPARATUS AND RECORDING MEDIUM

This application is a continuation of copending U.S. patent application Ser. No. 11/920,937, entitled VIDEO DATA REPRODUCING APPARATUS, VIDEO DATA GENERATING APPARATUS AND RECORDING MEDIUM by Shuichi Watanabe and Jiro Kiyama, the same inventors as the inventors of this continuation application, filed on 3 Apr. 2009, which application claims the benefit of International Application No. PCT/JP2006/311841 filed on Jun. 13, 2006 and Japanese Patent Applications Nos. JP 2005-179791, filed on 20 Jun. 2005 and JP 2005/227579, filed 5 Aug. 2005.

TECHNICAL FIELD

The present invention relates to a video data reproducing apparatus which receives plural sets of video data and outputs a playback video formed by combining a plurality of decoded videos that are acquired by decoding the plural sets of video data, as well as relating to a video data generating apparatus for video data which will be used to output a playback video by combining a plurality of decoded videos that are acquired from the plural sets of video data.

BACKGROUND ART

With the development of high-speed network infrastructure and with the development of large capacity recording media, the absolute quantity of video data that can be handed at a time by the user or by user video equipment has markedly increased. With this trend, various functions that are achieved using a plurality of sets of video data and high-performance applications based on such functions have been emerging. As one of such functions, there is a function called picture in picture. "Picture in picture" is a function for displaying two images at the same time by superimposing a small child frame over the screen (parent frame). This function is used for, for example "multi-angle representation" for displaying a video taken from a different angle of view from that of the video for the parent frame or for "commentary display" for displaying additional information in a commentary style as to the video of the parent frame (for example, displaying a director's commentary video or the like for recording untold stories during shooting the video).

This picture-in-picture function is realized for example by a process made up of decoding two sets of video data over two different layers and superimposing these decoded videos, as shown in FIG. 17.

Further, FIG. 18 shows different display styles of a video in the child frame in picture-in-picture functionality; the child frame may be a rectangular video 1801 or may be a video 1802 having an arbitrary shape. The picture-in-picture function and the method of realizing it are described in for example patent document 1 and others.
Patent Document 1:
 Japanese Patent Application Laid-open 2005-123775

DISCLOSURE OF INVENTION

Problems to be Solved by the Invention

In picture in picture, two videos are reproduced and displayed at the same time. For this reason, when for example a special playback such as high-speed playback etc. of the picture in the parent frame is directed during picture-in-picture representation, conventionally there has been no limitation imposed on whether the video in the child frame should be played in the special playback mode following the video of the parent frame or no special play is done; that is, this depended on the existing configuration of the individual player. Accordingly, it was impossible on the video distributor side to limit the operation during the special playback. Here, the special playback refers to video playback modes different from the normal playback mode, including slow-motion playback, frame-by-frame playback, reverse playback in addition to video playback at high speeds such as double-speed playback, four-speed playback etc.

FIG. 19 shows three typical routes (broadcasting, communication (network) and package distribution) when video content is distributed from a distributor to a consumer. As complex distributing methods, there is a practice that the basic part is sent by broadcasting or package distribution while additional part is sent by communication (network). When a video including picture in picture is distributed from a distributor to consumers in the above way, in some utility (applications) there are cases where the video distributor's side wants to designate their own way of reproduction during the special playback in picture in picture.

As an example, when a video displayed in the child frame is given as a privilege video, there is a request for viewers to set up such a condition that the video should be viewed to the end without using high-speed playback. On the contrary, in the existing picture in picture, the playback style during the special playback depends on the player side as mentioned above, hence there has been no way to realize such demands from the distributor's side.

The present invention has been devised in view of the above problem, it is therefore an object to provide a video data reproducing apparatus and video data generating apparatus and the like, which makes it possible to realize a playback style that reflects the distributor's intention for the way of reproduction during the special playback of a picture-in-picture video.

Means for Solving the Problems

In order to solve the above problems, the first invention is a video data reproducing apparatus which receives a plurality of sets of video data and outputs a playback video that is obtained by combining a plurality of decoded videos obtained by decoding the plurality of sets of video data, and includes: a decoding means for decoding the plurality of sets of video data to obtain the plurality of decoded videos; a synthesizing means for combining the plurality of decoded videos to obtain the playback video; an indication information reading means for reading out indication information that designates a playback style of the playback video, from at least one of the plurality of sets of video data; and a managing means for managing the playback style by controlling at least one of the operations of the decoding means and the synthesizing means in accordance with the indication information read out by the indication information reading means.

The second invention is a video data reproducing apparatus which receives a plurality of sets of video data and management data regarding at least one of the plurality of sets of video data and outputs a playback video that is obtained by combining a plurality of decoded videos obtained by decoding the plurality of sets of video data, and is includes: a decoding means for decoding the plurality of sets of video data to obtain the plurality of decoded videos; a synthesizing means for combining the plurality of decoded videos to obtain the playback video; an indication information reading means for reading out indication information that designates a playback style of the playback video, from the management data; and a managing means for managing the playback style by controlling at least one of the operations of the decoding means and the synthesizing means in accordance with the indication information read out by the indication information reading means.

The third invention is based on the first or second invention and characterized in that the playback video is a video given in a picture-in-picture format.

The fourth invention is based on the third invention and characterized in that the playback style refers to a playback style during a special playback, and the indication information is information that indicates, in the video in the picture-in-picture format, whether or not a video in a child frame is played in the special mode while a video in a parent frame is being played in the special mode.

The fifth invention is based on the third invention and characterized in that the playback style refers to a playback style during a special playback, and the indication information is information that indicates, in the video in the picture-in-picture format, whether or not a video in a child frame is displayed while a video in a parent frame is being played in the special mode.

The sixth invention is based on the third invention and characterized in that the playback style refers to a playback style during a special playback, and the indication information is information that indicates, in the video in the picture-in-picture format, whether or not a video in a parent frame is played in the special mode while a video in a child frame is being played in the special mode.

The seventh invention is based on the first or second invention and characterized in that the playback video is a video given in a double-frame display format.

The eighth invention is based on the seventh invention and characterized in that the playback style refers to a playback style during a special playback, and the indication information is information that indicates, in the video in the double-frame display format, whether or not a video in one frame is played in the special mode while a video in the other frame is being played in the special mode.

The ninth invention is based on the seventh invention and characterized in that the playback style refers to a playback style during a special playback, and the indication information is information that indicates, in the video in the double-frame format, whether or not a video in one frame is displayed while a video in the other frame is being played in the special mode.

The tenth invention is a video data generating apparatus which is used to output a playback video by combining a plurality of decoded videos that are obtained from a plurality of sets of video data, and includes: an encoding means for encoding input video to obtain encoded video data; and an indication information writing means for writing indication information that designates a playback style of the playback video, into the video data.

The eleventh invention is a video data generating apparatus which is used to output a playback video by combining a plurality of decoded videos that are obtained from a plurality of sets of video data, and includes: an encoding means for encoding input videos to obtain encoded video data; a generating means for generating management data regarding the video data; and an indication information writing means for writing indication information that designates a playback style of the playback video, into the management data.

The twelfth invention is based on the eleventh invention and further includes a multiplexed data generating means for generating multiplexed data in which the video data and the management data with the indication information written therein are multiplexed.

The thirteenth invention is based on any one of the tenth to twelfth inventions and characterized in that the playback video is a video given in a picture-in-picture format.

The fourteenth invention is based on the thirteenth invention and characterized in that the playback style refers to a playback style during a special playback, and the indication information is information that indicates, in the video in the picture-in-picture format, whether or not a video in a child frame is played in the special mode while a video in a parent frame is being played in the special mode.

The fifteenth invention is based on the thirteenth invention and characterized in that the playback style refers to a playback style during a special playback, and the indication information is information that indicates, in the video in the picture-in-picture format, whether or not a video in a child frame is displayed while a video in a parent frame is being played in the special mode.

The sixteenth invention is based on the thirteenth invention and characterized in that the playback style refers to a playback style during a special playback, and the indication information is information that indicates, in the video in the picture-in-picture format, whether or not a video in a parent frame is played in the special mode while a video in a child frame is being played in the special mode.

The seventeenth invention is based on any one of the tenth to twelfth inventions and characterized in that the playback video is a video given in a double-frame display format.

The eighteenth invention is based on the seventeenth invention and characterized in that the playback style refers to a playback style during a special playback, and the indication information is information that indicates, in the video in the double-frame display format, whether or not a video in one frame is played in the special mode while a video in the other frame is being played in the special mode.

The nineteenth invention is based on the seventeenth invention and characterized in that the playback style refers to a playback style during a special playback, and the indication information is information that indicates, in the video in the double-frame format, whether or not a video in one frame is displayed while a video in the other frame is being played in the special mode.

Effect of the Invention

In the present invention, an indication flag that designates the playback style of the video in the child frame (whether the video should follow the special playback of the parent frame) during special playback of the video in the parent frame is included in the video data of the video for the child frame. Alternatively, the flag is stored in the management data that is independent from the video data for the parent frame and child frame. In this way, indication information using the indication flag is handled with video data when the video data is distributed or the like. In the video reproducing apparatus, the stored indication flag is read out and made use of so that it becomes possible to execute the special playback in picture-in-picture mode in accordance with the distributor's intention (the video in the child frame can be played in the special mode following the video playback of the parent frame or can be played independently). As a result, the playback style in picture-in-picture mode will not depend on the player's existing configuration.

BRIEF DESCRIPTION OF DRAWINGS

FIG. 6 shows tables representing the corresponding relationships between the values of indication flags and the playback styles during special playback, used in a video reproducing apparatus according to the first embodiment of the present invention.

FIG. 8 is an illustrative view showing a schematic configuration of video data handled in the first embodiment of the present invention.

FIG. 10 is an illustrative view showing another schematic configuration of video data handled in the first embodiment of the present invention.

FIG. 12 is an illustrative view showing screen-displayed examples of videos reproduced in the first embodiment of the present invention.

Figure 1:
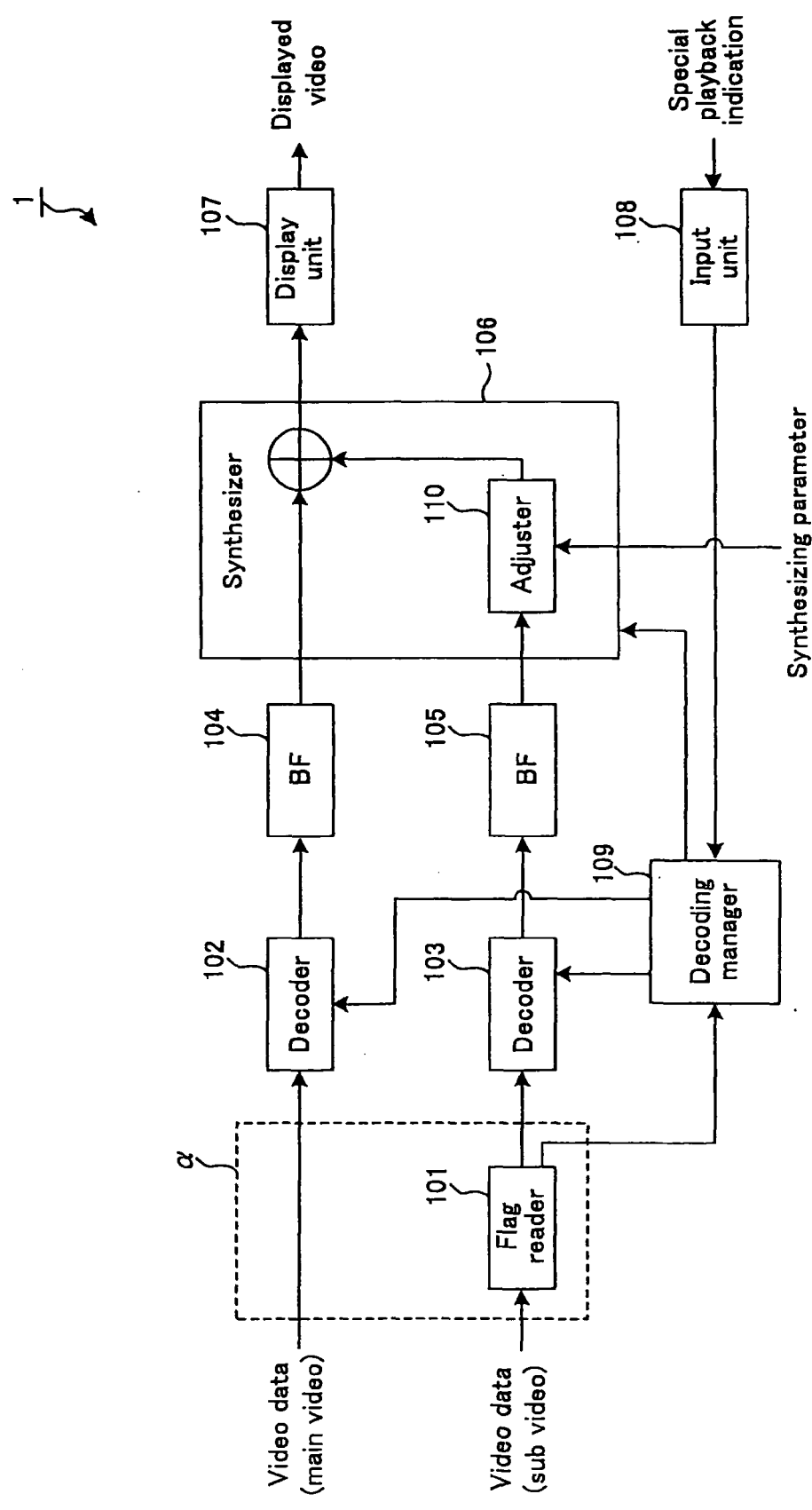
FIG. 1 is a functional block diagram showing a schematic configuration of a video reproducing apparatus according to the first embodiment of the present invention.

DESCRIPTION OF REFERENCE NUMERALS 1 video reproducing apparatus
101 flag reader
102, 103 decoders
104, 105 buffers (BFs)
106 synthesizer
107 display unit
108 input unit
109 decoding manager
110 adjuster

BEST MODE FOR CARRYING OUT THE INVENTION (The First Embodiment)

To begin with, a video reproducing apparatus according to the first embodiment of the present invention will be described with reference to FIGS. 1 through 12.

FIG. 1 is a functional block diagram showing a schematic configuration of a video reproducing apparatus 1 according to the first embodiment of the present invention. Video reproducing apparatus 1 receives two sets of video data (encoded video streams), decodes these and produces an output display of a combined video of the decoded videos to display the combined video. In this specification, the video displayed in the parent frame in a picture-in-picture representation and the video displayed in the child frame in a picture-in-picture representation hereinbelow will be called "main video" and "sub video", respectively, in distinction from each other.

Video reproducing apparatus 1 is comprised of: a flag reader 101 for reading out an aftermentioned indication flag from the video data for sub video; decoders 102 and 103 for decoding the encoded data of respective sets of video data; buffers (BFs) 104 and 105 for buffering the associated decoded videos to output them in accordance with synthesizing timing; a synthesizer 106 for synthesizing these decoded videos; a display unit 107 for displaying the output video; an input unit 108 for receiving user input; and a decoding manager 109 for controlling the decoding processes of decoders 102 and 103. Further, the above synthesizer 106 includes an adjuster 110 for adjusting the decoded video for sub video as to its display size and displayed position for synthesizing.

Video reproducing apparatus 1 according to the present embodiment, in flag reader 101 an aftermentioned indication flag is readout from video data and output. In actual decoding of video data, there are cases in which separation of associated audio data and/or readout of management information accompanying video (information required to decode data, such as information that indicates the encoded format of video and the like, information required to reproduce video, such as play list information that specifies the temporal video clipping and joining) is needed, separation and reading of these are omitted in FIG. 1 for description simplicity.

First, in flag reader 101 the indication flag that designates a playback style during the special playback is read out from the video data for sub video. The thus read-out indication flag is input to decoding manager 109 to be used during the special playback of the picture-in-picture video. The specific content of the indication flag will be detailed afterwards.

Now, the operation during the normal playback will be described. In the case of the normal playback, the video data for main video and the video data for sub video (with its indication flag read out) are input to decoders 102 and 103 to decode them sequentially. Then, each of the decoded video data is temporarily stored in buffer (BF) 104 or 105, and sent out to synthesizer 106 after output timing adjustment.

Synthesizer 106 incorporates adjuster 110. Of the two decoded videos input to synthesizer 106, the decoded video corresponding to sub video is input to adjuster 110 from BF 105. In adjuster 110, as a pre-process for superimposing the sub video over the main video, image size adjustment and displayed position setting of the sub video are carried out. The numerical values specifying the image size and displayed position of the sub video (child image) may have been previously stored as synthesizing parameters in video reproducing apparatus 1 or may be input by the user. Alternatively, they may be determined interactively with the user. The thus adjusted sub video is laid over, and combined with, the decoded video corresponding to the main video that is input from BF 104.

Here, it is possible to make the main video show through by setting the transmittance of the sub video when they are combined. Also, this transmittance may have been stored beforehand as a synthesizing parameter in video reproducing apparatus 1 or may be determined interactively with the user.

The picture-in-picture video thus combined by and output from synthesizer 106 is displayed on a monitor or the like through display unit 107.

Next, the operation when the special playback is directed will be described. Video reproducing apparatus 1 includes input unit 108, which receives a special playback direction from the user. Input unit 108, as it receives the special playback direction input, converts it into special playback indication information that represents the direction content and sends the special playback indication information to decoding manager 109.

Decoding manager 109 receives the special playback indication information from input unit 108 and the indication flag that designates the playback style during the special playback, read out from the video data for sub video by flag reader 101. Decoding manager 109, as it receives the aforementioned special playback indication information, controls the processes of two decoders 102 and 103 and synthesizer 106 so as to perform the special playback in the picture in picture mode, with one of the playback styles shown in FIGS. 2 to 5. At this point, the indication flag input through flag reader 101 is used to determine in which playback style the special playback should be done.

Figure 2:
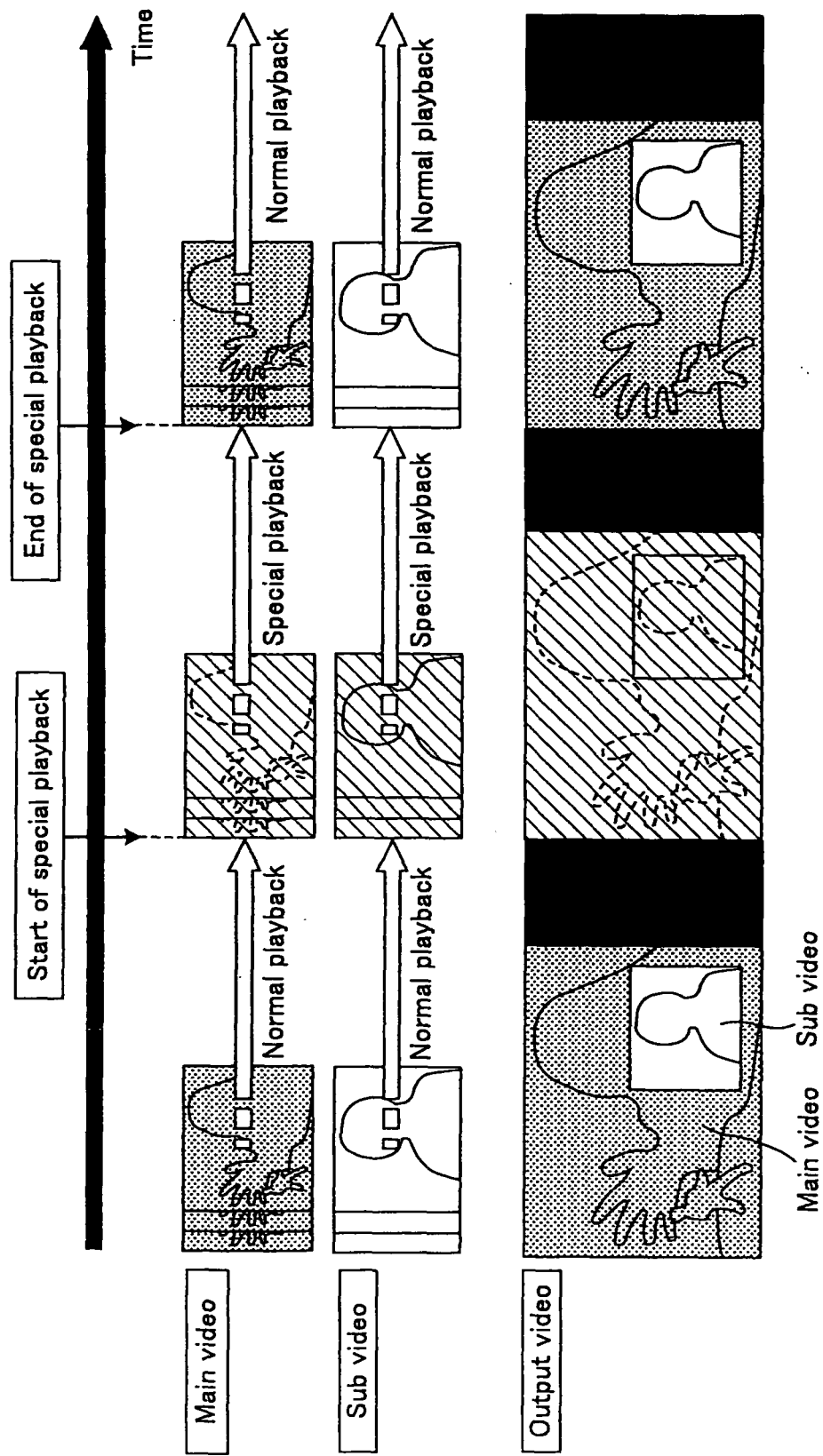
FIG. 2 is an illustrative view showing a playback style during special playback in a video reproducing apparatus according to the first embodiment of the present invention.

Playback style (A) shown in FIG. 2 shows a playback style in which when the special playback of the main video is directed, the sub video is also played in the special mode following the main video. In this case, decoding manager 109 of video reproducing apparatus 1 directs two decoders 102 and 103 to execute the special playback (the decoding processes for the special playback) in synchronism. As decoders 102 and 103 receive this direction, they thin the frames of data to be decoded, for example, decode and output I-frames only when high-speed playback is selected, to realize high-speed playback of both the main and sub videos. The thus output decoded videos are input to synthesizer 106 similarly to the normal playback, where they are combined to be output and displayed.

Here, in order to make the above-described synchronous special playback easy, it is possible to add a process for matching the inserted positions of I-frames in main video and in sub video with each other when they are encoded. Further, it is also possible to make the data structure of main video and that of sub video coincide with each other, by including the GoP (Group of Picture) structure, or the data structure in the inter-frame predictive-encoding system defined in the MPEG (Moving Picture Expert Group) standard. Matching the data structures of main video and sub video by including the GoP structure makes it possible to achieve smooth synchronization including P-frames during the special playback.

Figure 3:
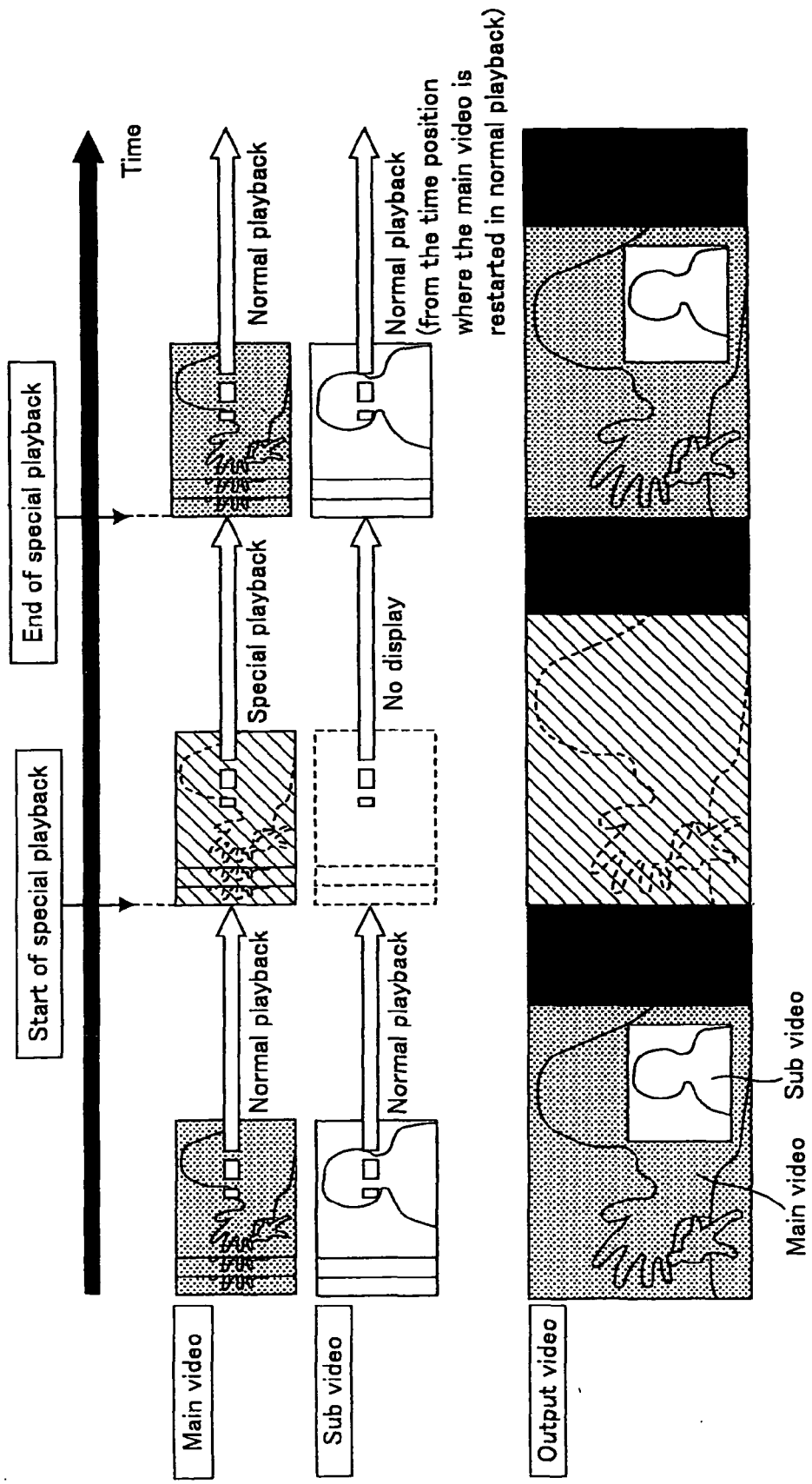
FIG. 3 is a view showing another playback style during special playback in a video reproducing apparatus according to the first embodiment of the present invention.

Playback style (B) shown in FIG. 3 shows a playback style in which when the special playback of main video is directed, the output of sub video is stopped while the special playback of main video is being played, and when the normal playback of main video is restarted, the sub video is combined once again and displayed from the time position corresponding to the time position of the main video from which the normal playback is restarted. In this case, decoding manager 109 of video reproducing apparatus 1 directs decoder 102 alone to execute the special playback (a decoding process for the special playback). Also, decoding manager 109 directs synthesizer 106 to stop combining sub video during the special playback. When restart of the normal playback is directed, decoding manager 109 directs decoder 102 to perform the normal playback (a decoding process for the normal playback) and also directs decoder 103 to start decoding the video data of sub video from the time position corresponding to the time position of the main video from which the normal playback is restarted. Then, after normal playback is restarted, both the main and sub decoded images are input to synthesizer 106 where they are combined to be output and displayed.

The playback styles in FIGS. 2 and 3 are the examples in which main video and sub video are reproduced in synchronization. That is, in the playback styles in FIGS. 2 and 3, main video and sub video are played back based on the same time reference.

Figure 4:
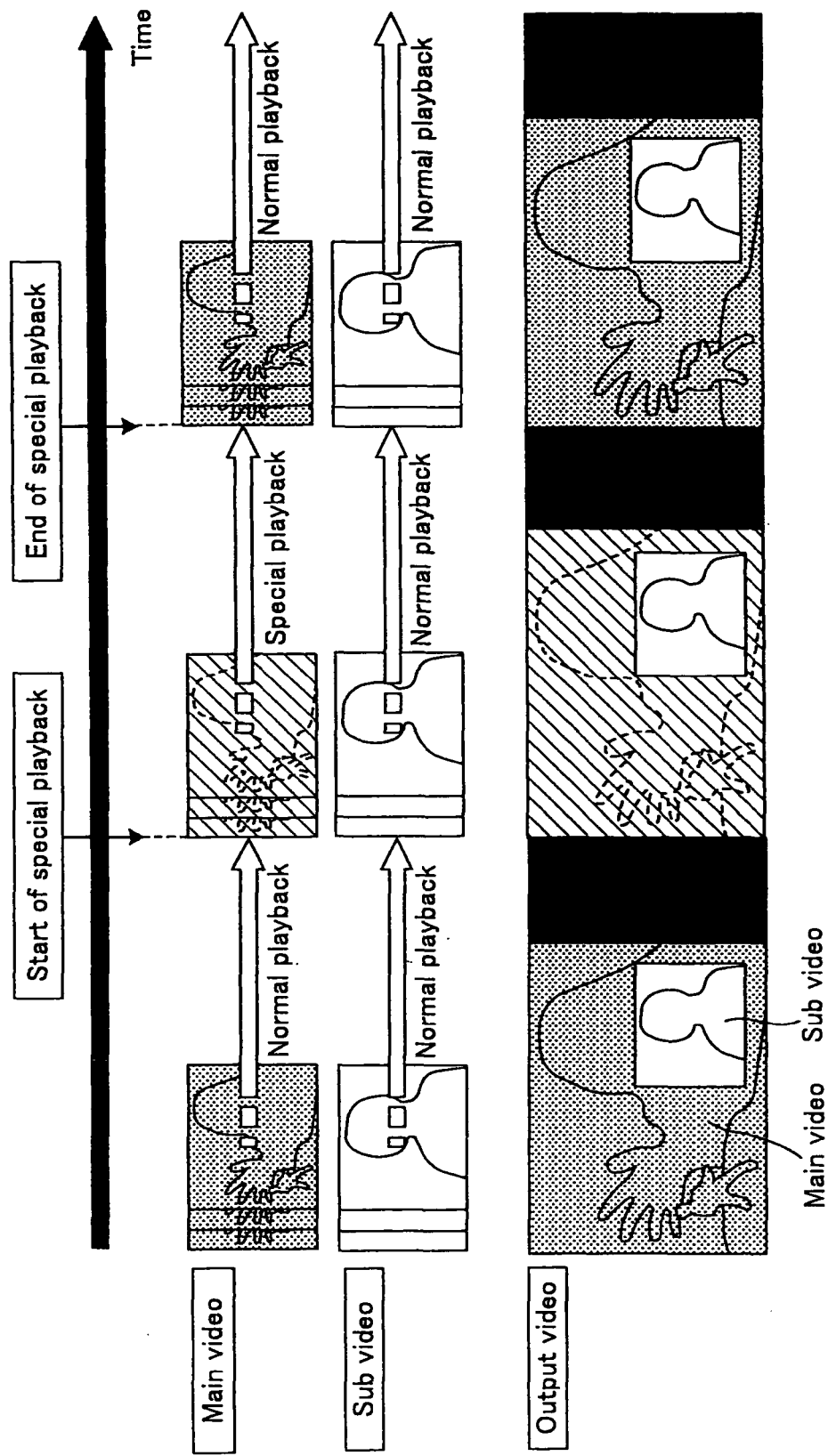
FIG. 4 is an illustrative view showing still another playback style during special playback in a video reproducing apparatus according to the first embodiment of the present invention.

Playback style (C) shown in FIG. 4 shows a playback style in which when the special playback of main video is directed, main video only is played in the special mode while sub video remains being played normally. In this case, decoding manager 109 of video reproducing apparatus 1 directs decoder 102 alone to execute the special playback (a decoding process for the special playback). Decoder 103 continues decoding for the normal playback. Then the main video that is output in the special playback mode from decoder 102 and the sub video that is output in the normal playback mode from decoder 103 are input to synthesizer 106 similarly to the normal playback mode, whereby they are combined to be output and displayed.

Figure 5:
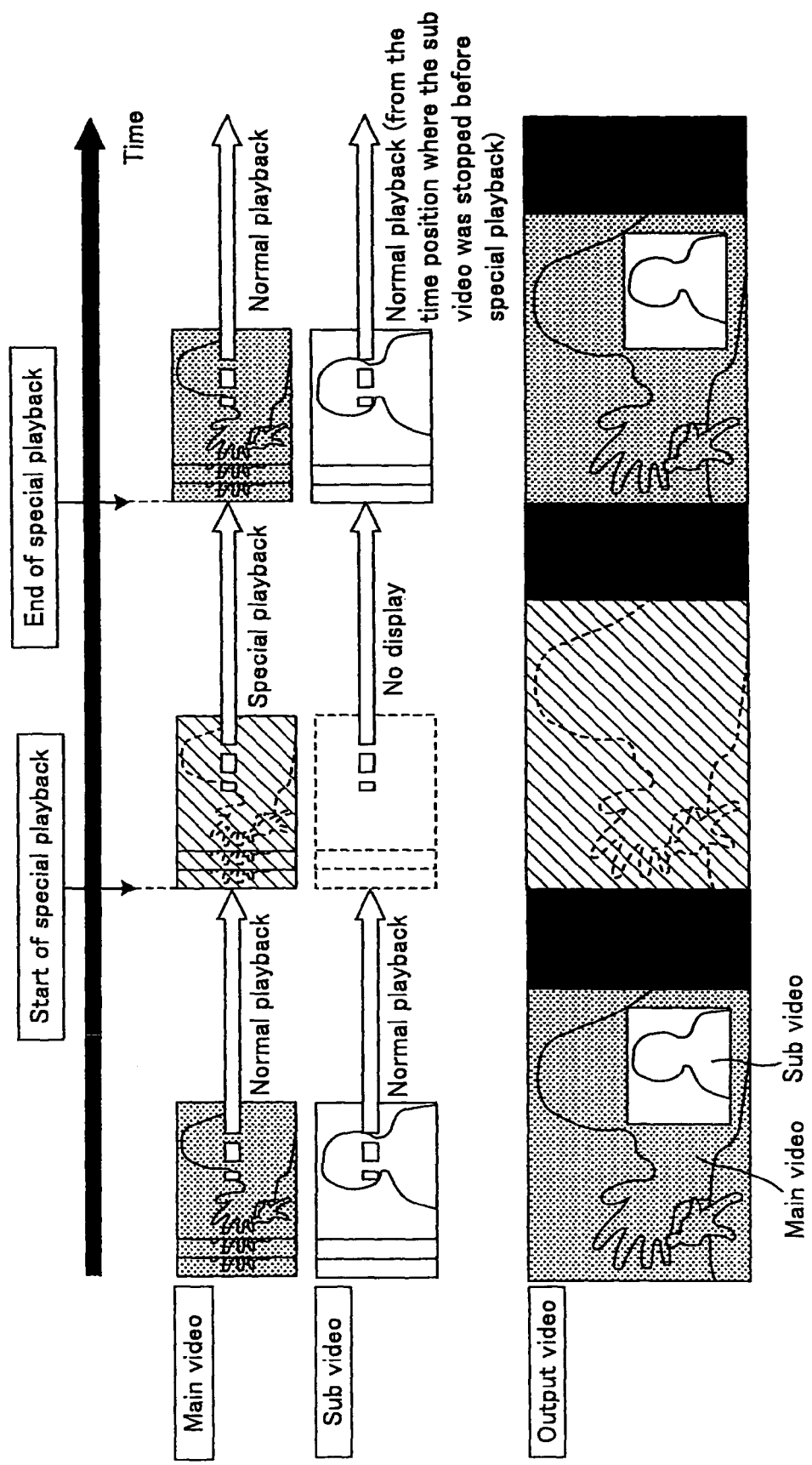
FIG. 5 is an illustrative view showing still another playback style during special playback in a video reproducing apparatus according to the first embodiment of the present invention.

Playback style (D) shown in FIG. 5 shows a playback style in which when the special playback of main video is directed, the output of sub video is stopped while the special playback of main video is continued, and after the normal playback of the main video is restarted, the sub video is restarted to be synthesized and displayed from the time position where the sub video was stopped. In this case, decoding manager 109 of video reproducing apparatus 1 directs decoder 102 alone to execute the special playback (a decoding process for the special playback). Also, decoding manager 109 directs synthesizer 106 to stop synthesizing of the sub video during the special playback. When restart of the normal playback is directed, decoding manager 109 directs decoder 102 to perform the normal playback (a decoding process for the normal playback) and also directs decoder 103 to start decoding of the sub video from the position where the sub video was stopped when the special playback was started. Then, after the normal playback is restarted, both main and sub videos are input to synthesizer 106 where they are combined to be output and displayed.

The playback styles in FIGS. 4 and 5 are the examples in which reproduction of main video and that of sub video become asynchronous when the special playback is performed. That is, in the playback styles in FIGS. 4 and 5, the main video and sub video are played based on different reference points of time.

Now, the indication flag will be described. The indication flag read out at flag reader 101 and input to decoding manager 109 is used to determine in which style, among the above-described styles, the special playback is performed. That is, the value of the indication flag contained in the video data for sub video controls whether the sub video is played synchronously (FIGS. 2 and 3) or asynchronously (FIGS. 4 and 5)

with the main video. In this specification, the following three types are defined as the indication flags to be set.

[Playback Style Indication Flag]:

A binary flag for indicating, when main video is played in the special mode, whether sub video is played in the special mode following the main video or is played in an independent mode (e.g., the normal mode), not being played following the main video.

[Dependent Playback Disable Flag]:

A binary flag that, when main video is played in the special mode, prohibits sub video from being played in the special mode in accordance with the main video. When this flag is "true", the sub video is always played independently (e.g., in the normal mode) from the special playback of the main video.

[Independent Playback Disable Flag]:

A binary flag that, when the main video is played in the special mode, prohibits the sub video from being played independently (e.g., in the normal mode) not following the main video. When this flag is "true", sub video is always played in the special mode, following main video.

The video data contains anyone or more of these indication flags, based on the value or the values, the playback style in picture in picture during the special playback in video reproducing apparatus 1 is determined. Tables in FIG. 6 show specific corresponding relationships between the values of these indication flags and possible playback styles (A) (FIG. 2) and (C) (FIG. 4).

Table 601 in FIG. 6 shows the relationships between the value of the playback style indication flag, "independent" or "dependent" and the playback style which video reproducing apparatus 1 is permitted to take when the playback style indication flag is "independent" or "dependent". When the playback style indication flag is "independent", sub video does not follow the special playback of main video and is played in the normal mode based on an independent reference time. When the playback style indication flag is "dependent", sub video follows the special playback of main video and is played in special mode based on the same reference time.

Here, when in order to facilitate synchronous special playback a process of matching the inserted positions of I-frames in main video and in sub video with each other was added when they were encoded, the value of this flag can be interpreted as directly indicating whether the positions of I-frames are adjusted (the flag value is "dependent") or not matched (the flag value is "independent").

Table 602 in FIG. 6 shows the relationships between the value of the dependent playback disable flag, "true" or "false" and the playback style which video reproducing apparatus 1 is permitted to take when the dependent playback disable flag is "true" or "false". When the dependent playback disable flag is "true", sub video does not follow the special playback of main video and is played in the normal mode based on an independent reference time. On the other hand, when the dependent playback disable flag is "false", video reproducing apparatus 1 can play in either mode.

Further, table 603 in FIG. 6 shows the relationships between the value of the independent playback disable flag, "true" or "false" and the playback style which video reproducing apparatus 1 is permitted to take when the independent playback disable flag is "true" or "false". When the independent playback disable flag is "true", sub video is played in the special mode based on the same reference time, following the special playback of main video. On the other hand, when the independent playback disable flag is "false", video reproducing apparatus 1 can play in either mode.

The indication flags shown herein are mere examples, and any of these is a binary flag taking values of '0' and '1'. However, it is also possible to define and use a further complex indication flag taking multiple values. For example, it is possible to define an indication flag that prohibits dependent playback and permits independent playback and prohibits independent playback in the style of stopping reproduction of sub video as in FIG. 5 and only permits independent playback in the style of continuing normal playback of sub video as in FIG. 4.

In other words, other than the aforementioned binary flag taking two values of '0' and '1', representing 'dependent' or 'independent' playback, another binary flag taking two values of '0' and '1', representing 'displayed' or 'not displayed' or indicating whether sub video is continued to display while main video is being played in the special mode (FIGS. 2 and 4) or sub video is not displayed while main video is being played in the special mode (FIGS. 3 and 5), can be defined, so that it is possible to uniquely designate one of the playback styles (A) to (D) shown FIGS. 2 to 5 by combination of the values of these flags. Here, the former (the flag that represents whether playback is done 'dependently' or 'independently') and the latter (the flag that represents whether sub video is 'displayed' or 'not displayed') may be named 'playback indication flag' and 'display indication flag' for distinction.

For example, when the playback indication flag is set at 'dependent' and the display indication flag is set at 'displayed', playback style (A) of FIG. 2 is selected. In this reproduction, the sub video combined with main video can be seen as if the sub video were completely part of the main video, hence this style has the effect of showing main video and sub video so as not to be distinguishable in appearance. Therefore, if the video distributor wants such effect, each indication flag is set as above. On the contrary, if sub video is wanted to be shown as an additional image different from main video, the playback indication flag is set at 'dependent' and the display indication flag is set at 'not displayed' so as to select playback style (B) of FIG. 3.

As another case, when the playback indication flag is set at 'independent' and the display indication flag is set at 'displayed', playback style (C) of FIG. 4 is selected. This is the playback style to which a sub video which has markedly high priority, such as a sub video whose actual playback time is strictly determined, is applied, and the playback of the sub video will not stop until the sub video is completely played. On the other hand, in playback style (D) of FIG. 5 in which the playback indication flag is set at 'independent' and the display indication flag is set at 'not displayed', playback and display of sub video is stopped while main video is played back in the special mode, and after the normal playback of main video is restored, playback of the sub video is restarted from the position at which it was stopped. As a result, it is possible to avoid such an event that part of the sub video is carelessly missed while the apparatus is operated, hence this style is suitable to make sub video be seen properly.

In this way, use of an indication flag given with video data makes it possible to designate the playback style during the special playback in video reproducing apparatus 1. This indication flag is added on the side of the video data distributor when the video data of sub video is produced.

Figure 7:
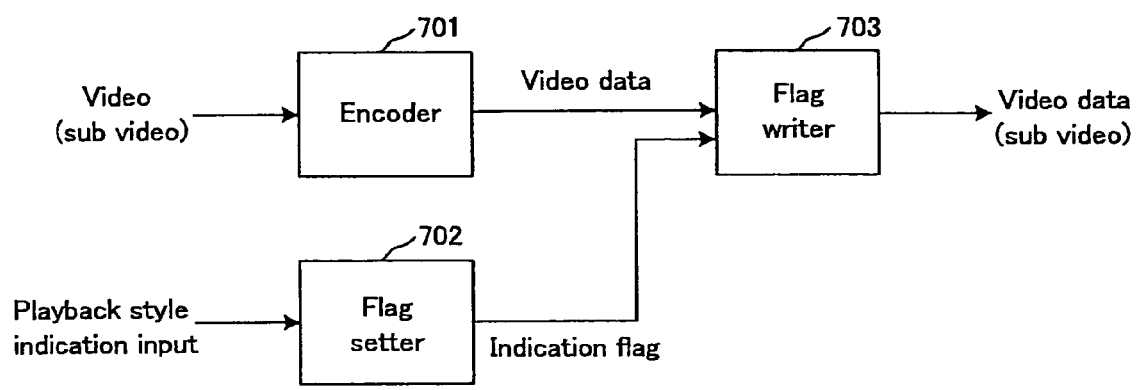
FIG. 7 is a functional block diagram showing a schematic configuration of a video data generating apparatus according to the first embodiment of the present invention.

FIG. 7 shows a block diagram showing a schematic configuration of a video data generating apparatus 11. Video data generating apparatus 11 includes an encoder 701, a flag setter 702 and a flag writer 703. Directional input from a video distributor is converted into an indication flag in flag setter 702. Input video is encoded by encoder 701 and converted into video data (encoded video stream). Then, the indication flag is stored into the video data (encoded video stream) through flag writer 703.

When the indication flag is embedded into video data (encoded video stream), the video distributor can specify the video data so that it is played in the special mode in picture in picture on a video reproducing apparatus in a playback style designated by the distributor. FIG. 8 shows examples of video data generated by video data generating apparatus 11 of FIG. 7, particularly showing examples of embedded positions of indication flags. As shown in FIG. 8, the indication flag may be embedded in the sequence header of video data (encoded video stream) (801), the indication flag may be embedded in each packet header (802), or when management information (play list information etc.) associated with an encoded video stream is recorded inside the video data, the indication flag may be stored in the management information (803). However, the embedded position of the indication flag in video data should not be limited to these.

The above video reproducing apparatus 1 according to the first embodiment was described taking an example in which the indication flag is included in the input video data (encoded video stream), but the invention is not limited to this. For example, when the data stream of video data is given with a data stream (management data stream) in which management information for managing the video data stream (the information required for data decoding such as information representing the video encoding system and/or information required for video reproduction such as play list information specifying temporal video clipping and joining) is given, and these data streams are input in a multiplexed data form, the indication flag may be stored in the management data stream, instead of being stored in the video data stream.

Further, the video data input to the aforementioned video reproducing apparatus 1 was described taking an example in which the indication flag is included in the video data of the sub video, however, not limited to this it is also possible that the indication flag is input while being stored in the video data of main video. The indication flag in this case functions as a flag that indicates whether an arbitrary sub video should or should not follow the special playback of the main video when the video data of an arbitrary sub video is combined with the video data of that main video.

Figure 9:
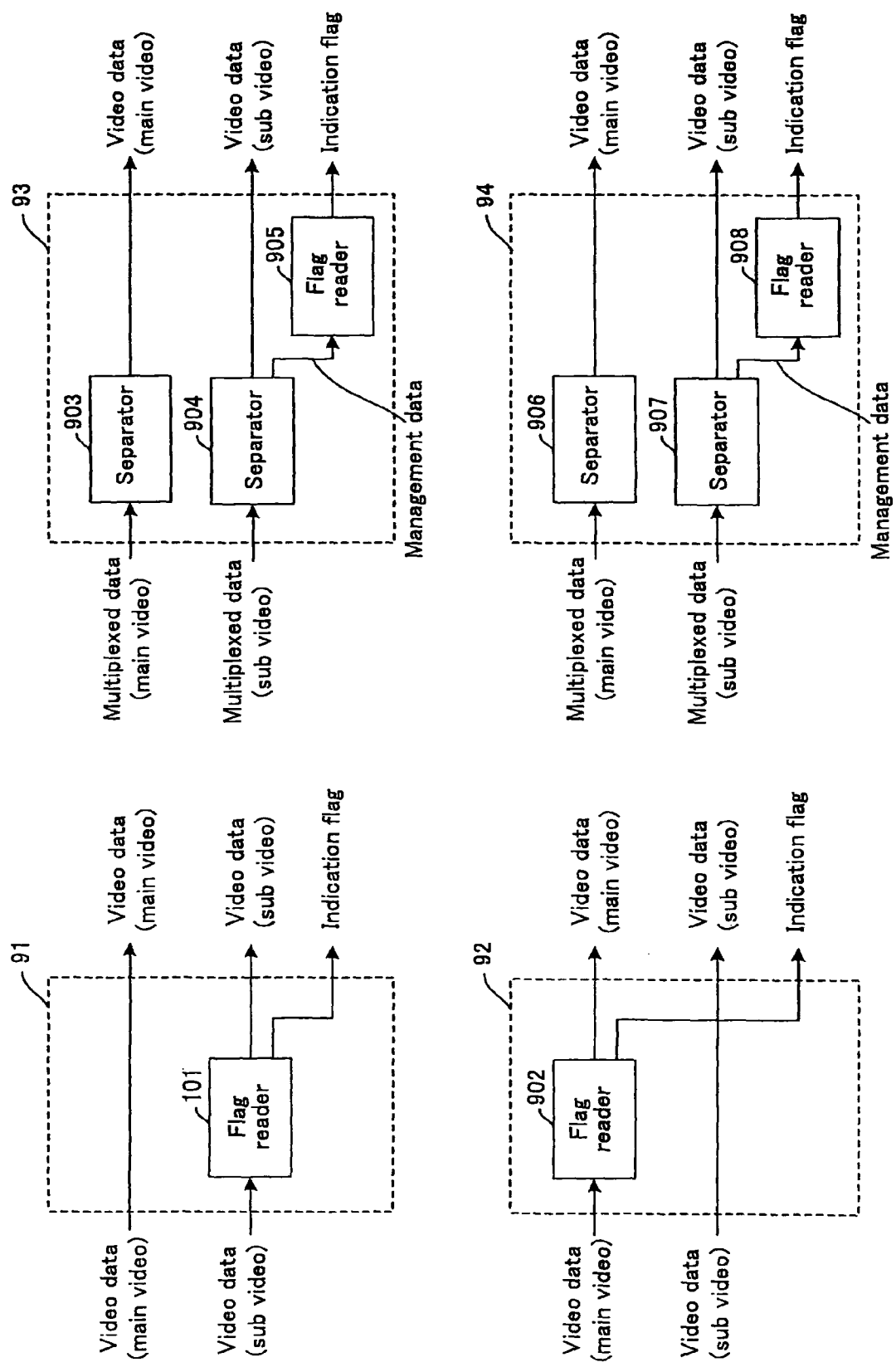
FIG. 9 is a functional block diagram showing another configuration of a video reproducing apparatus according to the first embodiment of the present invention.

FIG. 9 illustratively summarizes the differences of these input patterns. Designated at 91 and 92 are patterns where two sets of video data (encoded video streams) including an indication flag are input. Pattern 91 is the same as the portion α in FIG. 1. Designated at 93 and 94 are patterns where management data (stream) including an indication flag and a video data (stream) are multiplexed so that the multiplexed data is input. Separators 903 and 904 are functional units for separating the management data from the multiplexed data. Here, description of the handling of the separated management data is omitted. Patterns 91 and 93 show the cases where the indication flag is included in the video data (or corresponding management data) on the sub video side, whereas patterns 92 and 94 show the cases where the indication flag is included in the video data (or corresponding management data) on the main video side. Any of these patterns has two sets of video data and one indication flag as its output and can be connected in place of the portion a in FIG. 1.

Here, in 93 and 94 of FIG. 9, the multiplexed data is depicted to as being formed of two data streams of video data and management data alone, but practically audio data streams and other data streams also may be multiplexed. These are not illustrated in FIG. 9 for simplicity.

FIG. 10 shows examples of video data (encoded video stream) and a management data stream that constitute multiplexed data. As shown in FIG. 10, the indication flag is embedded in playback management information (play list information etc.) regarding the video data (encoded video stream) (1001), or is stored in decoding management information (encoding system information etc.) regarding the video data (encoded video stream) (1002). Here, the embedded position of the indication flag in the management data is not limited to this drawing.

Two decoders 102 and 103 in FIG. 1 either may have identical decoding capacities or may have different decoding capacities. In video reproducing apparatus 1 according to the first embodiment, which set of video data should be assigned to the video data for main video or to the video data for sub video has been determined beforehand when they are input. Accordingly, it is possible to define a set of video data having a lower resolution (smaller image size) than that of main video as being dedicated for sub video. In this case, as the decoder 103 to which the video data for sub video is input, a dedicated decoder that decodes video of lower resolution may be used for decoding the video data dedicated for sub video.

Further, in video reproducing apparatus 1 in FIG. 1, there could be a case where the video data to be input is video data that has not been encoded. In this case, no decoding of video data is needed, so that decoders 102 and 103, being no longer necessary to be functional blocks for decoding, can be replaced with functional blocks (separators 102' and 103') that separate the input video data appropriately and output them. Further, decoding manager 109 can be replaced with a functional block (separation manager 109') for managing the aforementioned functional blocks (separators 102' and 103') so as to perform separation and output of the video data.

Figure 11:
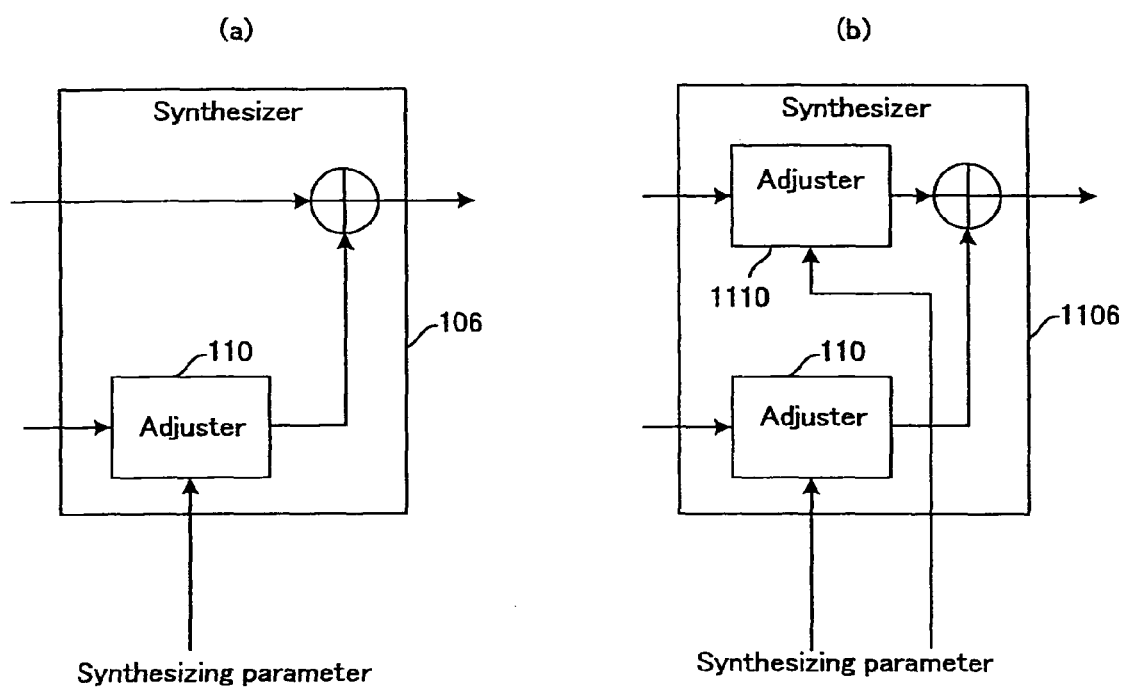
FIG. 11 is a functional block diagram showing still another configuration of a video reproducing apparatus according to the first embodiment of the present invention.

Further, though synthesizer 106 in video reproducing apparatus 1 shown in FIG. 1 is one that adjusts sub video only and does not make any adjustment for main video (that is, main video is displayed in the full screen) (FIG. 11(*a*)), synthesizer 106, not limited to this, can be replaced with a synthesizer 1106 which also includes an adjuster 1110 on the main video side to output adjusted video as shown in FIG. 11(*b*). FIG. 12 shows examples of output videos when synthesizer 1106 is used in place. In this case, main video can be resized arbitrarily as shown by 1202 in FIG. 12, or main and sub videos may be laid out side by side as two frames on the screen without the two images overlapping each other, as shown by 1203.

Other than the utility for picture-in-picture display, the video reproducing apparatus of the present invention can be applied to a video reproducing apparatus that displays two image frames, as shown in 1203 of FIG. 12. That is, embedding an indication flag in video data enables additional control that designates whether the special playback should be performed on one video in accordance with the special playback for the other video, it is hence possible to perform the special playback with the video in a double-frame display format in a mode intended by the video distributor side.

In video reproducing apparatus 1 according to the first embodiment of the present invention, an indication flag as the information representing the playback style during the special playback in picture in picture is input together with video data, and based on the indication flag the playback style during the special playback is determined. Accordingly, supplying the video data with the indication flag when the video distributor produces the video data, enables the video reproducing apparatus to perform the special playback in the picture-in-picture playback form, in a playback style that was intended by the distributor.

In the case of video reproducing apparatus 1 of the present embodiment or in the case 91 of FIG. 9, each video data has been defined to be for main video or for sub video when it is input, but a video data item produced for sub video may also be input as the video data for main video. In this case, the indication flag stored in the video data is disregarded. Similarly, in the case 92 of FIG. 9, a video data item containing an indication flag that was generated for main video may be input as the video data for sub video. Also in this case, the indication flag stored in the video data is disregarded. Further, a default playback style may be provided in video reproducing apparatus 1 so that the special playback is performed in the default playback style when no indication flag is detected from either main video or sub video.

Further, the indication flag explained in the above first embodiment is a flag that designates the behavior of sub video when main video is played in the special mode. However, it is possible to define an indication flag that designates the behavior of main video when the special playback of sub video is directed. Though this reference will not be particularly mentioned in the following embodiments, this matter should be similarly applied to the other embodiments.

Also, as the flags that designate the behavior of sub video to convey the video distributor's intention, other than the indication flag that designates the playback style in the special playback mode, a flag that prohibits sub video from being moved and/or enlarged may be stored together. The flag that prohibits sub video from being moved and/or enlarged is applied to players in which the display size and displayed position of sub video can be changed by the user. When the flag that prohibits sub video from being moved and/or enlarged is set to be 'true', the display size and displayed position of sub video are fixed relative to main video so that the user control will be rejected.

Further, in video reproducing apparatus 1 of the above first embodiment, a method of controlling the processes in the decoders was described as the method for realizing the special playback, the method of realizing the special playback is not limited to this. For example, in an exemplary case of high-speed playback, high-speed playback can also be realized by decoding all the frames first, then thinning the decoded images output from buffers 104 and 105 while adjusting timing, instead of performing the thinning process in the decoders as illustrated in the above embodiment. That is, the video reproducing apparatus 1 shown in FIG. 1 is a mere configurational form of an apparatus for realizing the special playback, and other apparatus configurations than this can be taken to realize the special playback, and the control of the special playback using indication flags of the present invention can similarly be applied to these. Though this reference will not be particularly mentioned in the following embodiments, this matter should be similarly applied to the other embodiments.

(The Second Embodiment)

Next, a video reproducing apparatus 2 according to the second embodiment of the present invention will be described using FIG. 13.

Figure 13:
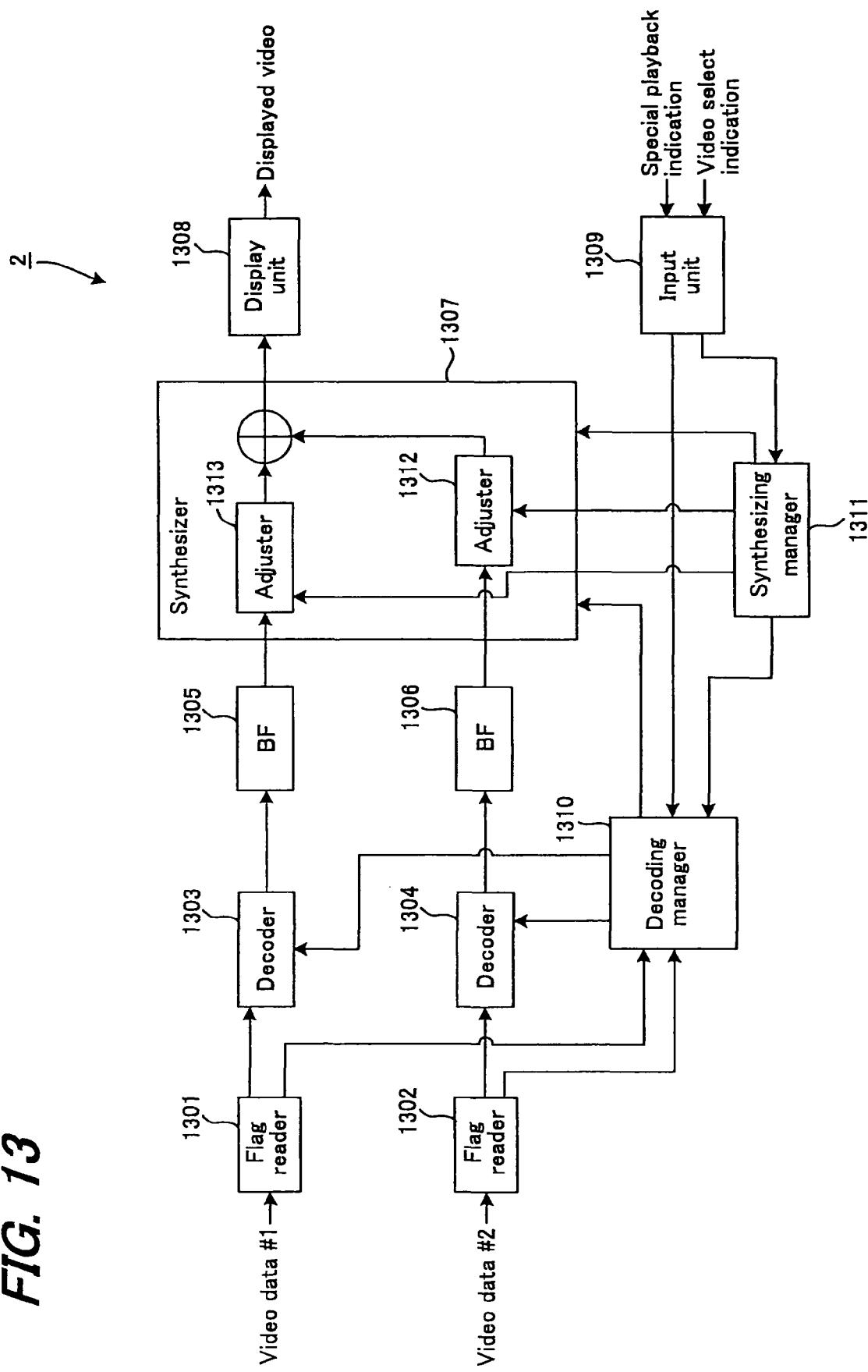
FIG. 13 is a functional block diagram showing a schematic configuration of a video reproducing apparatus according to the second embodiment of the present invention.

FIG. 13 is a functional block diagram showing a schematic configuration of a video reproducing apparatus 2 according to the second embodiment of the present invention. Video reproducing apparatus 2 includes: flag readers 1301 and 1302 for reading out indication flags from associated sets of video data; decoders 1303 and 1304; buffers (BFs) 1305 and 1306; a synthesizer 1307; a display unit 1308 (including adjusters 1312 and 1313); display unit 1308; an input unit 1309; a decoding manager 1310 and a synthesizing manager 1311 for controlling the synthesizing process performed by synthesizer 1307. Of these, either of flag readers 1301 and 1302 has the same function as flag reader 101 shown in FIG. 1. Further, decoders 1303 and 1304, buffers 1305 and 1305 and display unit 1308 have the same functions as decoders 102 and 103, buffers 104 and 105 and display unit 107 shown in FIG. 1, respectively. Moreover, adjusters 1312 and 1313 have the same function as adjuster 110 shown in FIG. 1. The operation of video reproducing apparatus 2 according to the second embodiment will be described hereinbelow focusing on the difference from video reproducing apparatus 1 of the first embodiment.

In the above-described video reproducing apparatus 1 according to the first embodiment, two inputs of video data are supplied with one having been assigned for the main and the other for the sub in the input stage. This scheme is most efficient when there is a set of video data that is dedicated for sub video, for example, a complimentary video added to a main video or something trivial like a commentary video of untold stories during shooting, which will not be played as main video.

On the contrary, in the video reproducing apparatus 2 of the second embodiment, distinction of two inputs of video data is not made with no classifying them as the main data or the sub data at the input stage, and the two videos are determined to be the main video and the sub video by adjusting the combination of the two videos in the video synthesizing stage. This scheme is most effective when the main video view and the sub video view are frequently swapped, for example, the displayed video views are frequently swapped in a multi-angle representation.

This is why video reproducing apparatus 2 includes synthesizing manager 1131, which is a new functional block that is not provided for video reproducing apparatus 1.

Input unit 1309 receives from the user a video select indication for swapping the main video and sub video (for selecting one as the main video and the other as the sub video) in addition to a special playback indication. Input unit 1309, when receiving the video select indication, issues video select indication information and transmits it to synthesizing manager 1311.

Synthesizing manager 1311 obtains the knowledge of the one for main display and the one for sub display from the aforementioned video select indication information, and sends out synthesizing parameters corresponding to the main video display and the sub video display, indicated by the video select indication information, to adjusters 1312 and 1313. It also notifies synthesizer 1307 of the top and bottom relationship (the sub image is laid over the main image) when they are put in layers. It is also possible to send settings such as transmittance etc. at the same time. Further, the decoding manager sends select information that represents which is selected as the sub video, to decoding manager 1310.

Flag readers 1301 and 1302 read out indication flags from the associated sets of input video data, and supply both the read-out indication flags to decoding manager 1310.

When decoding manager 1310 receives the special playback indication information issued by input unit 1309 in accordance with the user's special playback direction, the manager, referring to the aforementioned select information (information that represents which is selected as the sub video) supplied from synthesizing manager 1311, identifies the indication flag of the video data to be assigned for sub video, from two indication flags which has been input, and determines the playback style for the special playback in the picture-in-picture mode based on the indication flag, in a similar way to that as shown in the first embodiment.

In video reproducing apparatus 2, the input two sets of video data are both video data that can be reproduced as main and sub videos. Accordingly, in video reproducing apparatus 2, decoders 1303 and 134 have the completely equivalent functions.

(The Third Embodiment)

Next, a video reproducing apparatus 3 according to the third embodiment of the present invention will be described using FIGS. 14 to 16.

Figure 14:
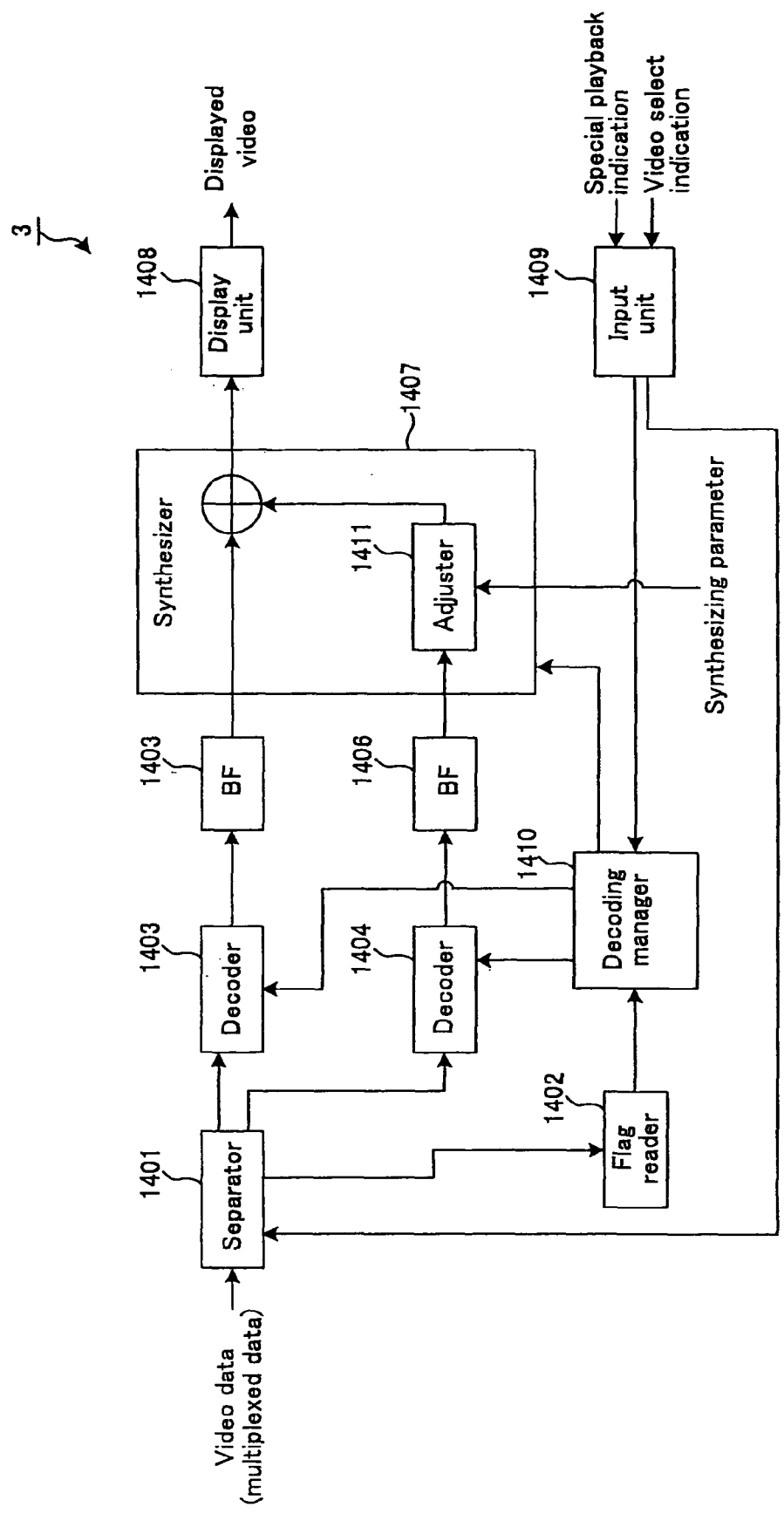
FIG. 14 is a functional block diagram showing a schematic configuration of a video reproducing apparatus according to the third embodiment of the present invention.

FIG. 14 is a functional block diagram showing a schematic configuration of video reproducing apparatus 3 according to the third embodiment of the present invention. Video reproducing apparatus 3 includes a separator 1401 for separating multiplexed data in which plural sets of video data are multiplexed, into plural sets of video data, management data and others; a flag reader 1402 for reading out an indication flag from the management data; two decoders 1403 and 1404; two buffers (BFs) 1405 and 1406; a synthesizer 1407 (including an adjuster 1411); a display unit 1408; an input unit 1409; and a decoding manager 1410. Of these, decoders 1403 and 1404, buffers 1405 and 1405, synthesizer 1407, adjuster 1411, display unit 1408 and decoding manager 1410 have the same functions as decoders 102 and 103, buffers 104 and 105, synthesizer 106, adjuster 110, display unit 107 and decoding manager 109 in video reproducing apparatus 1 shown in FIG. 1, respectively. In other words, the video reproducing apparatus 3 according to the third embodiment is different from the video reproducing apparatus 1 according to the first embodiment, only in separator 1401, flag reader 1402 (flag reader 101 in video reproducing apparatus 1) and input unit 1409 (input unit 108 in video reproducing apparatus 1). Now, the video reproducing apparatus 3 according to the third embodiment will be described focusing on the difference from the video reproducing apparatuses 1 and 2 according to the first and second embodiments.

In the above-described video reproducing apparatuses 1 and 2, an indication flag is stored inside the video data (encoded video stream) or inside the management data stream that is related in one-to-one correspondence to the video data, and this indication flag is used to control the playback style in the special playback mode when the video data is reproduced as a sub video view in picture-in-picture playback. In contrast to this, in video reproducing apparatus 3 according to the third embodiment, in a condition where plural sets of video data (encoded video streams) are given with an independent management data stream for controlling these video data, an indication flag stored in the management data stream is used to control the playback style in the special playback mode in picture-in-picture playback.

That is, the indication flag handled in video reproducing apparatus 3 is not one that represents the playback style for a particular one of the input video data but one that operates in such a manner that, only after one set of data is determined to the main video data and the other is determined to be the sub video data, it controls the playback style of the determined sub video. That is, in video reproducing apparatus 1 one video data, which has been determined as the main video and the other video data, which has been determined as the sub video are input; and in video reproducing apparatus 2, each video data is determined as either the main video or sub video in the synthesizing stage. In contrast, in video reproducing apparatus 3, when the multiplexed data is separated by separator 1401 one of the data is determined as the main video and the other is determined as the sub video, then the processes after decoders 1403 and 1404 follow.

Video reproducing apparatus 3 according to this embodiment is supplied with multiplexed data made of two sets of video data (encoded video streams) and a management data stream containing an indication flag and displays a video formed by combining the decoded images of the two sets of video data. FIG. 15 shows a functional block diagram showing a schematic configuration of a video data generating apparatus 31 for generating the multiplexed data to be input.

Figure 15:
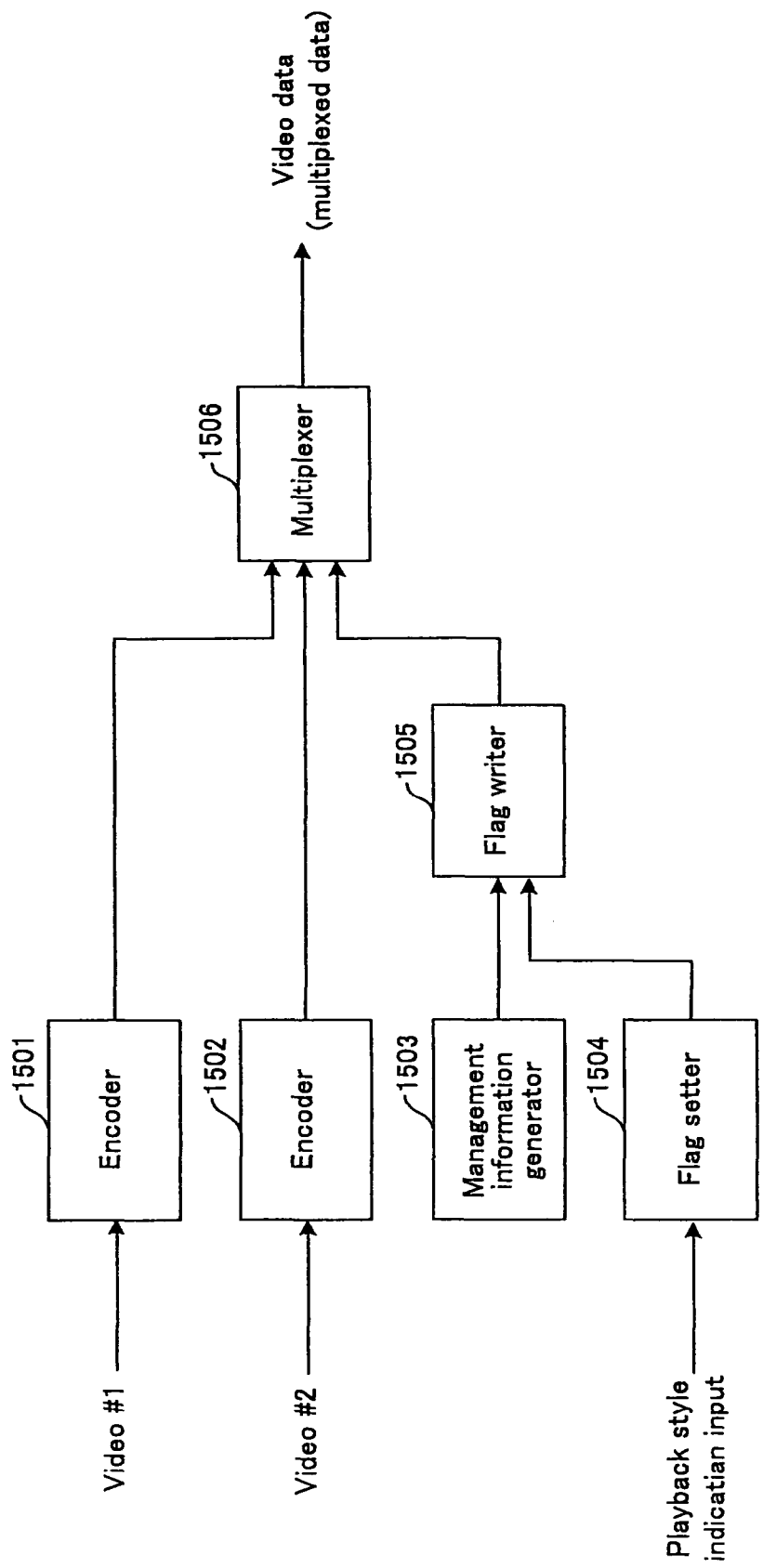
FIG. 15 is a functional block diagram showing a schematic configuration of a video data generating apparatus according to the third embodiment of the present invention.

Video data generating apparatus 31 of FIG. 15 includes two encoders 1501 and 1502, a management information generator 1503, a flag setter 1504, a flag writer 1505 and a multiplexer 1506.

The two input videos are converted into individual sets of video data (encoded video streams) through encoders 1501 and 1502, respectively. Flag setter 1504 generates an indication flag that corresponds to the playback style designated by the video distributor. The generated indication flag is written into the management information (management data stream) that is prepared by management information generator 1503, by flag writer 1505.

The management information stored in the management data stream includes: information recorded corresponding to individual video data (decoding management information), such as information representing the encoding system of the video data (encoded video stream) and the like; common information (playback management information) such as play list information that specifies playback of a plurality of sets of video data based on temporal clipping and joining information of video; and others.

Figure 16:
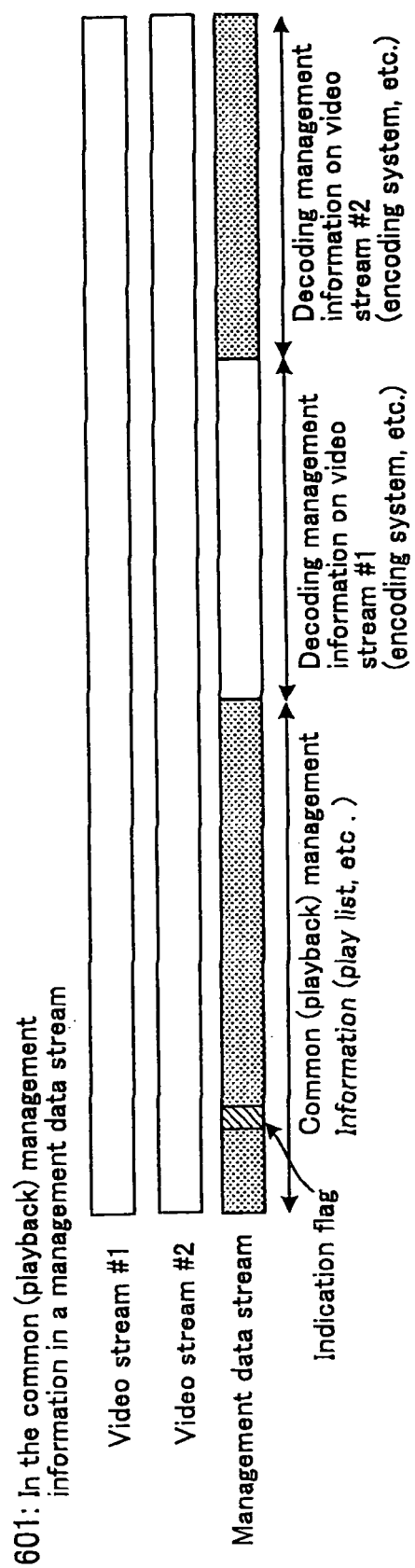
FIG. 16 is an illustrative view showing a schematic configuration of video data handled in the third embodiment of the present invention.
Figure 17:
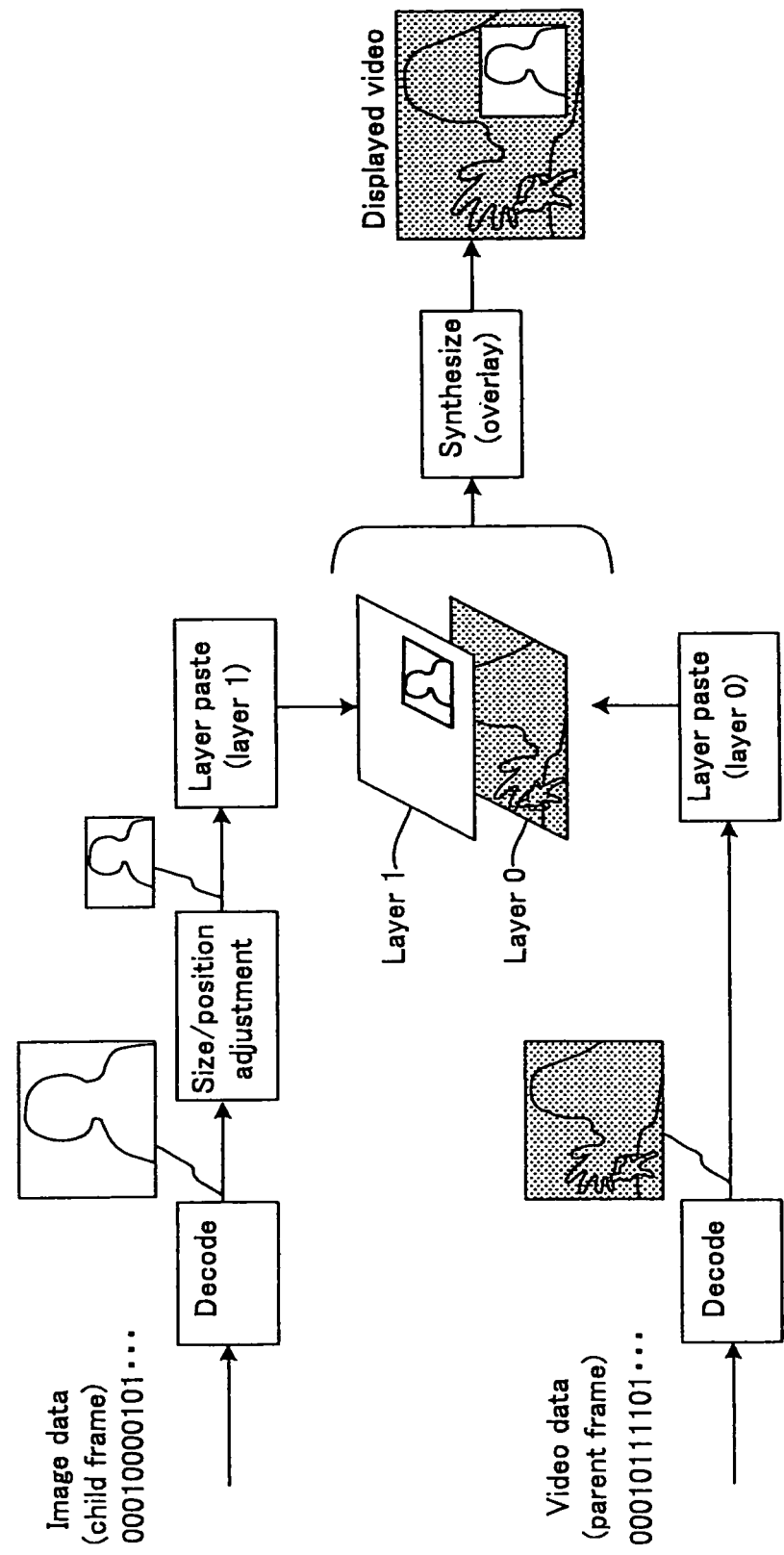
FIG. 17 is an illustrative view showing a method for realizing a conventional picture-in-picture function.
Figure 18:
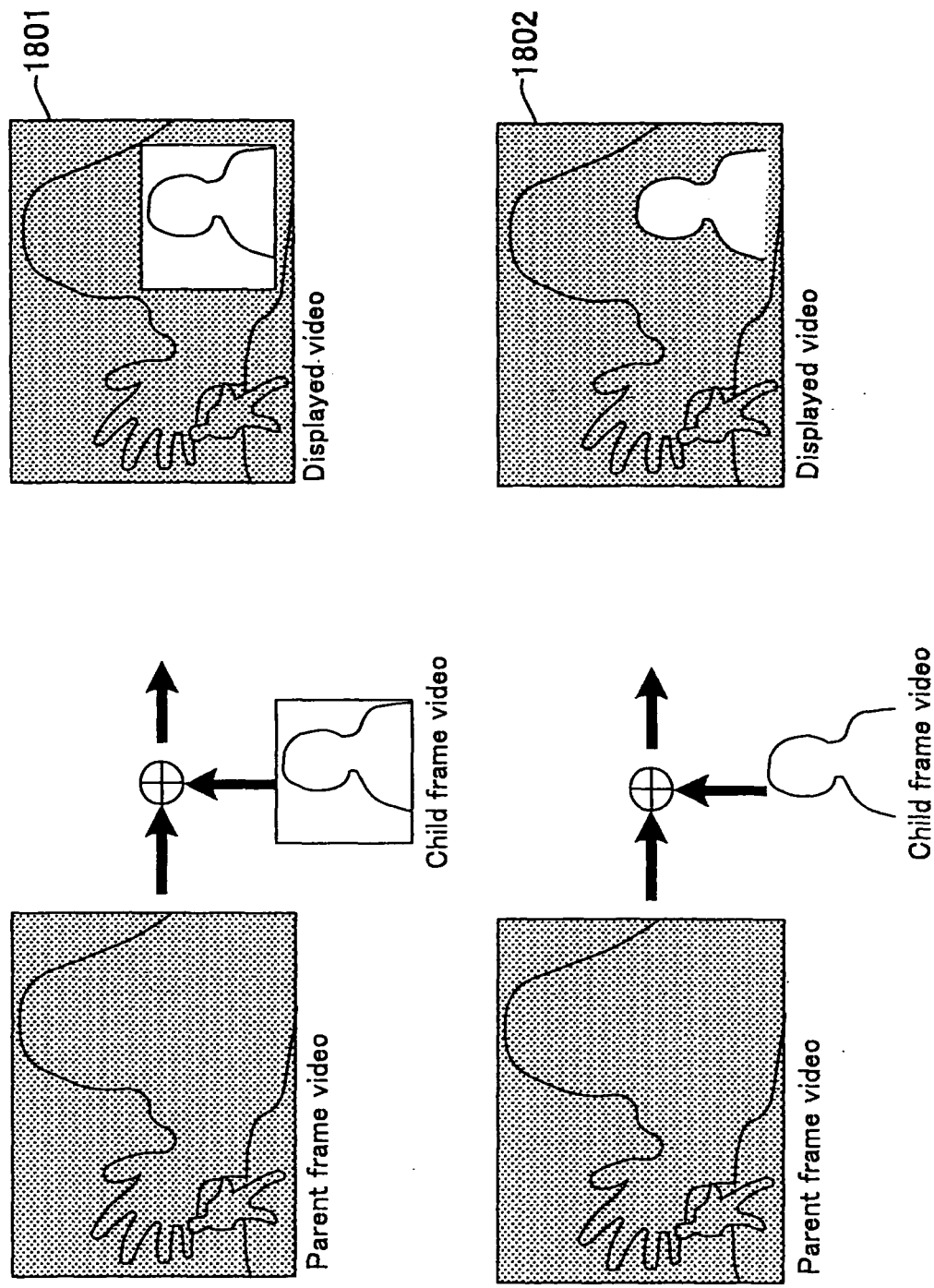
FIG. 18 is an example of a conventional picture-in-picture function.

Further, FIG. 16 shows an example of data (an example of an embedded position of an indication flag) before multiplexing of data generated in video data generating apparatus 31 of FIG. 15. As shown in FIG. 16 the indication flag is stored inside the common playback management information in management data stream (1601). These video data and management data are multiplexed by multiplexer 1506, forming multiplexed data.

After being supplied with the multiplexed data generated by video data generating apparatus 31 shown in FIG. 15, separator 1401 of video reproducing apparatus 3 of FIG. 14 operates as follows.

Similarly to video reproducing apparatus 2 of the second embodiment, input unit 1409 receives from the user a video select indication for swapping the main video and sub video (for selecting one as the main video and the other as the sub video). Input unit 1409, as receiving the video select indication, issues corresponding video select indication information and transmits it to separator 1401.

Separator 1401 separates the input multiplexed data into two sets of video data and management data, then supplies the video data that has been designated as main video to decoder 1403 and the video data that has been designated as sub video to decoder 1404 in accordance with the supplied video select indication information. The management data output from separator 1401 is supplied to flag reader 1402, where an indication flag is read out. The read-out indication flag is input to decoding manager 1410 and is used to control the playback style during the special playback in picture-in-picture reproduction. After this point, the same operation as described in the first embodiment follows.

In FIGS. 14 to 16 for the third embodiment, description is made such that the multiplexed data is composed of video data (encoded video streams) and management data (management data stream) alone, but practically, there are cases that audio data and other data are multiplexed. Here, for description convenience, such data other than the video data and management data are omitted from the illustration.

Further, video data (encoded data streams) and management data (management data stream) input to video reproducing apparatus 3 are depicted to be input in the multiplexed form. However, they do not necessarily need to be multiplexed. It is also possible to provide a configuration in which two sets of video data and one set of management, information are input through different individual channels so that they are processed. That is, the main feature of the video reproducing apparatus 3 according to the third embodiment is nothing other than that the indication flag that will not depend on any set of video data and can be used in common with plural sets of video data, is given to the apparatus through the intermediary of the management data.

Figure 19:
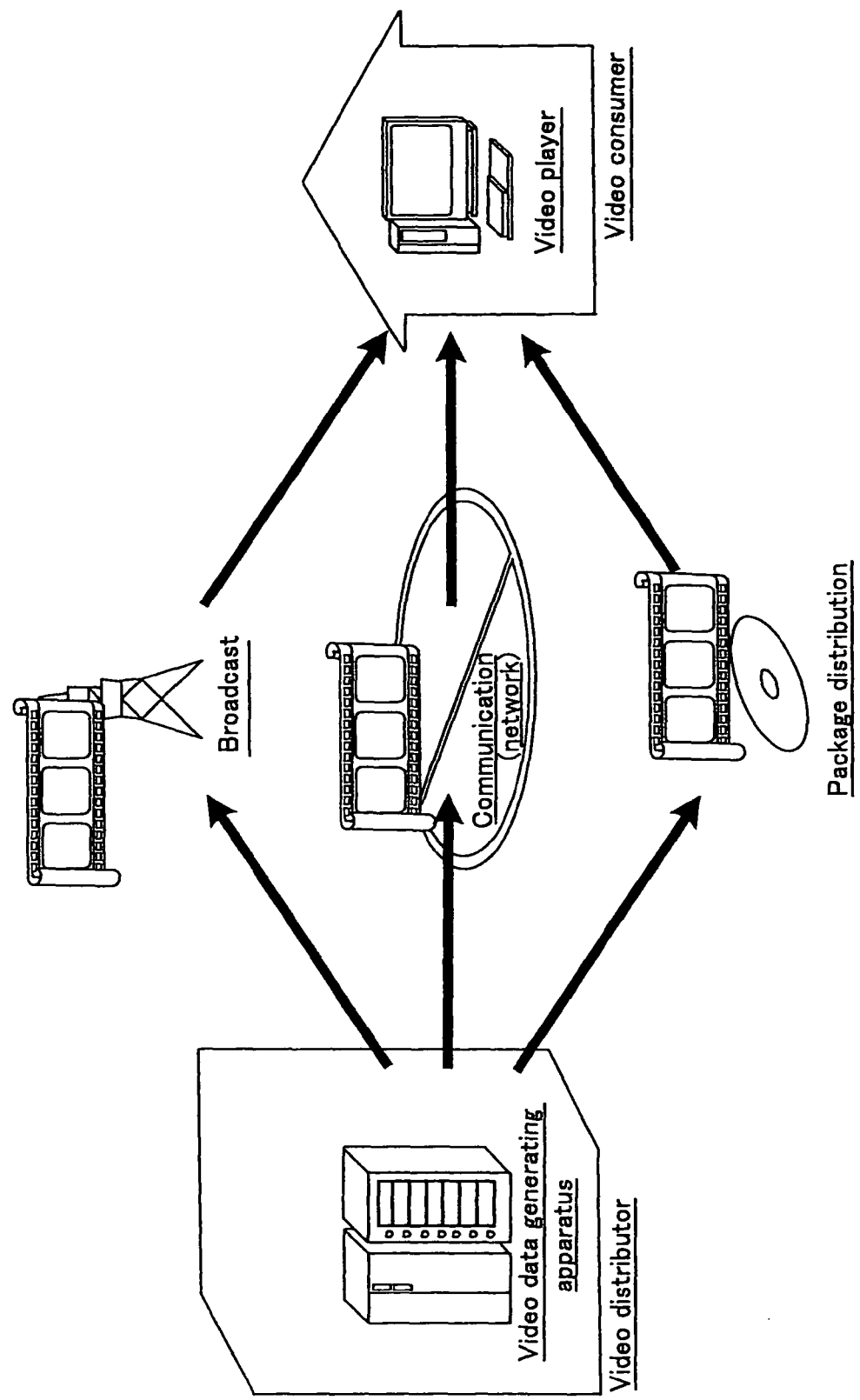
FIG. 19 is an illustrative view for explaining conventional video content distribution.

In any of the above embodiments of the present invention, the video reproducing apparatus according to each of the embodiments of the present invention was described on the assumption of the condition in which the video data (and management data) input through transmission paths such as broadcasting and communication is directly reproduced by the video reproducing apparatus. However, the applicable condition of the present invention is not limited to this. For example, the present invention is applicable to a condition in which video data (and management data) has been recorded on a recording medium in advance and the video data (and management data) recorded on the recording medium is sequentially read out to play it back. Application to package distribution in FIG. 19 corresponds to this. Further, the situation is the same where the data is recorded once on a recording medium through a transmission channel and then the recorded video data (and management data) is read out to play it back. That is, the present invention can be applied to a recording medium on which video data or management data, including an indication flag detailed in each embodiment has been recorded, as well as to a video reproducing apparatus for playing back such a recording medium.

The indication flag stored in the video data (or management data) described in each embodiment of the present invention was described as unchangeable information on the playback style during the special playback of picture-in-picture video in order to reflect the video distributor's intention. However, this indication flag stored in the video data (or management data) may be used on the playback side as a field for recording the user's playback preference. Alternatively, there could occur a case where the aforementioned indication flag is rewritten on the video reproducing apparatus side to the value that is limited by the reproducing capacity of the video reproducing apparatus. Such rewriting is done by the video reproducing apparatus, which rewrites the value in the storage field of the indication flag, when recording video data (and management data) input through a transmission channel such as broadcasting, communication or the like onto a recording medium or when reading out video data (and management data) sequentially from a recording medium to play it. This rewriting process may be done by user's direct input or may be modified dynamically using a program such as Java (registered trademark) or the like. That is, the present invention can be applied to a video reproducing apparatus for the video data or management data, containing an indication flag that was detailed in each embodiment no matter where the indication flag value was finally set up.

Here, it is to be understood that the embodiments disclosed herein are, in all respects, illustrative and not restrictive. The scope of the present invention is defined by the scope of claims rather than the foregoing description, and all changes that fall within the meaning and scope equivalent to the scope of claims are intended to be embraced by the claims.

The invention claimed is:

1. A non-transitory, computer-readable recording medium recording recorded with a plurality of sets of video data and management data regarding at least one of the plurality of sets of video data, and reproduced by a video data reproducing apparatus which outputs a playback video that is obtained by combining a plurality of decoded videos obtained by decoding the plurality of sets of video data in a multi-frame display format including a picture-in-picture format, wherein
   the management data includes indication information that designates a playback style of a second decoded video when a first decoded video of the playback video is switched from a normal playback mode to a special playback mode,
   the indication information indicates that the second decoded video displayed as the playback video in the multi-frame display format is not displayed during a period when the first decoded video displayed as the playback video in the multi-frame display format is being played in the special playback mode, and
   the recording medium is reproduced by the video data reproducing apparatus which reads out the plurality of sets of video data and the management data and, by controlling at least one of the operations of a decoding portion which decodes the plurality of sets of video data and a synthesizing portion which creates the playback video in the multi-frame display format in accordance with the indication information included in the management data, outputs the playback video in which the second decoded video displayed as the playback video in the multi-frame display format is not displayed during a period when the first decoded video displayed as the playback video in the multi-frame display format is being played in the special playback mode such that only the first decoded video is displayed in the special playback mode, which is selected from the group consisting of a high-speed playback, a slow-motion playback, a frame-by-frame playback, and a reverse playback.

2. A non-transitory, computer-readable recording medium recording recorded with a plurality of sets of video data and management data regarding at least one of the plurality of sets of video data, and reproduced by a video data reproducing apparatus which outputs a playback video that is obtained by combining a plurality of decoded videos obtained by decoding the plurality of sets of video data in a multi-frame display format including a picture-in-picture format, wherein
   the management data includes indication information that designates a playback style of a second decoded video when a first decoded video of the playback video is switched from a normal playback mode to a special playback mode,
   the indication information indicates that the second decoded video displayed as the playback video in the multi-frame display format is not displayed during a time period when the first decoded video displayed as the playback video in the multi-frame display format is being played in the special playback mode, and
   the recording medium further records a program by which the video data reproducing apparatus reads out the plurality of sets of video data and the management data and, by controlling at least one of the operations of a decoding portion which decodes the plurality of sets of video data and a synthesizing portion which creates the playback video in the multi-frame display format in accordance with the indication information included in the management data, outputs the playback video in which the second decoded video displayed as the playback video in the multi-frame display format is not displayed during a period when the first decoded video displayed as the playback video in the multi-frame display format is being played in the special playback mode such that only the first decoded video is displayed in the special playback mode, which is selected from the group consisting of a high-speed playback, a slow-motion playback, a frame-by-frame playback and a reverse playback.

3. The non-transitory, computer-readable recording medium according to claim 1 or 2, wherein a display format of the playback video is the picture-in-picture format, the first decoded video is a video in a parent frame, and the second decoded video is a video in a child frame.

4. A non-transitory, computer-readable recording medium recording recorded with a plurality of sets of video data, and reproduced by a video data reproducing apparatus which outputs a playback video that is obtained by combining a plurality of decoded videos obtained by decoding the plurality of sets of video data in a multi-frame display format including a picture-in-picture format, wherein
at least one of the plurality of sets of video data includes indication information that designates a playback style of a second decoded video when a first decoded video of the playback video is switched from a normal playback mode to a special playback mode,
the indication information indicates that the second decoded video displayed as the playback video in the multi-frame display format is not displayed during a period when the first decoded video displayed as the playback video in the multi-frame display format is being played in the special mode, and
the recording medium is reproduced by the video data reproducing apparatus which reads out the plurality of sets of video data and, by controlling at least one of the operations of a decoding portion which decodes the plurality of sets of video data and a synthesizing portion which creates the playback video in the multi-frame display format in accordance with the indication information included in at least one of the plurality of sets of video data, outputs the playback video in which the second decoded video displayed as the playback video in the multi-frame display format is not displayed during a period when the first decoded video displayed as the playback video in the multi-frame display format is being played in the special mode such that only the first decoded video is displayed in the special playback mode, which is selected from the group consisting of a high-speed playback, a slow-motion playback, a frame-by-frame playback and a reverse playback.

5. A non-transitory, computer-readable recording medium recording recorded with a plurality of sets of video data, and reproduced by a video data reproducing apparatus which outputs a playback video that is obtained by combining a plurality of decoded videos obtained by decoding the plurality of sets of video data in a multi-frame display format including a picture-in-picture format, wherein
at least one of the plurality of sets of video data includes indication information that designates a playback style of a second decoded video when a first decoded video of the playback video is switched from a normal playback mode to a special playback mode,
the indication information indicates that the second decoded video displayed as the playback video in the multi-frame display format is not displayed during a period when the first decoded video displayed as the playback video in the multi-frame display format is being played in the special mode, and
the recording medium further records a program by which the recording medium is reproduced by the video data reproducing apparatus which reads out the plurality of sets of video data and, by controlling at least one of the operations of a decoding portion which decodes the plurality of sets of video data and a synthesizing portion which creates the playback video in the multi-frame display format in accordance with the indication information included in at least one of the plurality of sets of video data, outputs the playback video in which the second decoded video displayed as the playback video in the multi-frame display format is not displayed during a period when the first decoded video displayed as the playback video in the multi-frame display format is being played in the special mode such that only the first decoded video is displayed in the special playback mode, which is selected from the group consisting of a high-speed playback, a slow-motion playback, a frame-by-frame playback and a reverse playback.

6. The non-transitory, computer-readable recording medium according to claim 4 or 5, wherein a display format of the playback video is the picture-in-picture format, the first decoded video is a video in a parent frame, and the second decoded video is a video in a child frame.

7. The non-transitory, computer-readable recording medium according to claim 1 or 2, wherein the indication information further indicates that, when the first decoded video is switched from the special playback mode to the normal playback mode, the second decoded video is displayed as the playback video in the multi-frame display format.

8. The non-transitory, computer-readable recording medium according to claim 4 or 5, wherein the indication information further indicates that, when the first decoded video is switched from the special playback mode to the normal playback mode, the second decoded video is displayed as the playback video in the multi-frame display format.

9. A video synthesizing apparatus which receives a plurality of sets of video data and outputs a playback video in a picture-in-picture format that is obtained by combining videos of the plurality of sets of video data, comprising:
a reading portion for reading out indication information that designates a playback style while the playback video is being played in a special playback mode, from at least one of the plurality of sets of video data; and
a synthesizing portion, in accordance with the indication information readout by the reading portion, for combining the videos of the plurality of sets of video data in the designated playback style, wherein
the indication information is information that indicates that, when a video in a parent frame in a playback video in a picture-in-picture format is switched from a normal playback mode to the special playback mode, a video in a child frame in the playback video in the picture-in-picture format is not displayed during a period when the video in the parent frame is being played in the special playback mode such that only the video in the parent frame is displayed in the special playback mode, which is selected from the group consisting of a high-speed playback, a slow-motion playback, a frame-by-frame playback, and a reverse playback.

10. A video synthesizing apparatus which receives a plurality of sets of video data and management data regarding at least one of the plurality of sets of video data and outputs a playback video in a picture-in-picture format that is obtained by combining videos of the plurality of sets of video data, comprising:

a reading portion for reading out indication information that designates a playback style while the playback video is being played in a special playback mode, from the management data; and a synthesizing portion, in accordance with the indication information read out by the reading portion, for combining the videos of the plurality of sets of video data in the designated playback style, wherein the indication information is information that indicates that, when a video in a parent frame in a playback video in a picture-in-picture format is switched from a normal playback mode to the special playback mode, a video in a child frame in the playback video in the picture-in-picture format is not displayed during a period when the video in the parent frame is being played in the special playback mode such that only the video in the parent frame is displayed in the special playback mode, which is selected from the group consisting of a high-speed playback, a slow-motion playback, a frame-by-frame playback and a reverse playback.

11. A non-transitory, computer-readable medium storing programs for causing a computer to perform each of the functions of the video synthesizing apparatus according to claim 9 or 10, in order to output the playback video in the picture-in-picture format based on the indication information.

12. A video synthesizing apparatus which receives a plurality of sets of video data and outputs a playback video in a double-frame format that is obtained by combining videos of the plurality of sets of video data, comprising:

a reading portion for reading out indication information that designates a playback style while the playback video is being played in a special playback mode, from at least one of the plurality of sets of video data; and a synthesizing portion, in accordance with the indication information readout by the reading portion, for combining the videos of the plurality of sets of video data in the designated playback style, wherein the indication information is information that indicates that, when a first video in a first frame in a playback video in a double-frame format in which two videos do not overlap each other is switched from a normal playback mode to the special playback mode, a second video in a second frame in the playback video in the double-frame format is not displayed during the period when the first video is being played in the special playback mode such that only the first video in the first frame is displayed in the special playback mode, which is selected from the group consisting of a high-speed playback, a slow-motion playback, a frame-by-frame playback, and a reverse playback.

13. A video synthesizing apparatus which receives a plurality of sets of video data and management data regarding at least one of the plurality of sets of video data and outputs a playback video in a double-frame format that is obtained by combining videos of the plurality of sets of video data, comprising:

a reading portion for reading out indication information that designates a playback style while the playback video is being played in a special playback mode, from the management data; and a synthesizing portion, in accordance with the indication information readout by the reading portion, for combining the videos of the plurality of sets of video data in the designated playback style, wherein the indication information is information that indicates that, when a first video in a first frame in a playback video in a double-frame format in which two videos do not overlap each other is switched from a normal playback mode to the special playback mode, a second video in a second frame in the playback video in the double-frame format is not displayed during a period when the first video is being played in the special playback mode such that only the first video in the first frame is displayed in the special playback mode, which is selected from the group consisting of a high-speed playback, a slow-motion playback, a frame-by-frame playback, and a reverse playback.

14. A non-transitory, computer-readable medium storing programs for causing a computer to perform each of the functions of the video synthesizing apparatus according to claim 12 or 13, in order to output the playback video in the double-frame format based on the indication information.

15. A video synthesizing apparatus according to claim 9 or 10, wherein the indication information further indicates that, when the video in the parent frame is switched from the special playback mode to the normal playback mode, the video in the child frame is displayed as the playback video in the picture-in-picture format.

16. The video synthesizing apparatus according to claim 12 or 13, wherein the indication information further indicates that, when the first video is switched from the special playback mode to the normal playback mode, the second video is displayed as the playback video in the double-frame format.

* * * * *